United States Patent [19]

Fimian et al.

[11] Patent Number: 4,920,263

[45] Date of Patent: Apr. 24, 1990

[54] RADON DETECTION SYSTEM

[75] Inventors: Keith S. Fimian, Dunn Loring; John E. McGreevy, McLean; Brian P. Fimian, Falls Church, all of Va.; Richard W. Tucker, Timonium, Md.

[73] Assignee: Gemini Research, Inc., McLean, Va.

[21] Appl. No.: 148,729

[22] Filed: Jan. 26, 1988

[51] Int. Cl.$^5$ .......................... G01T 1/20; G01V 5/00
[52] U.S. Cl. ...................................... 250/255; 250/253
[58] Field of Search ........................ 250/256, 253, 255

[56] References Cited

U.S. PATENT DOCUMENTS

| | | | |
|---|---|---|---|
| 3,169,188 | 2/1965 | Horner et al. | 250/484.1 C |
| 3,283,153 | 11/1966 | Geiger | 250/253 |
| 3,426,197 | 2/1969 | Waly et al. | 250/484.1 C |
| 3,502,876 | 3/1970 | Lasseur | 250/370 A |
| 3,665,194 | 5/1972 | Alter et al. | 250/253 |
| 3,805,070 | 4/1974 | Auxier et al. | 250/370 A |
| 3,914,602 | 10/1975 | Goldstein | 250/253 |
| 3,922,555 | 11/1975 | Chapuis et al. | 250/472 |
| 3,968,371 | 7/1976 | Greendale | 250/380 |
| 4,053,775 | 10/1977 | Franklin et al. | 250/364 |
| 4,055,762 | 10/1977 | Durkin | 250/253 |
| 4,104,523 | 8/1978 | Wolfert | 250/370 |
| 4,129,776 | 12/1978 | Fleischer | 250/253 |
| 4,140,912 | 2/1979 | Bressan et al. | 250/435 |
| 4,177,378 | 12/1979 | Stevens | 250/462.1 |
| 4,179,614 | 12/1979 | Felice et al. | 250/253 |
| 4,185,199 | 1/1980 | Droullard et al. | 250/435 |
| 4,216,380 | 8/1980 | Stieff | 250/255 |
| 4,268,748 | 5/1981 | Stieff | 250/255 |
| 4,297,574 | 10/1981 | Card et al. | 250/253 |
| 4,336,451 | 6/1982 | Stieff | 250/255 |
| 4,338,523 | 7/1982 | Alter | 250/472 |
| 4,352,014 | 9/1982 | Powell | 250/253 |
| 4,417,142 | 9/1982 | Malmqvist et al. | 250/253 |
| 4,426,575 | 1/1984 | Malmqvist et al. | 250/253 |
| 4,468,558 | 8/1984 | Malmqvist et al. | 250/253 |
| 4,518,860 | 5/1985 | Alter et al. | 250/253 |
| 4,607,165 | 8/1986 | Burghoffer et al. | 250/435 |
| 4,678,916 | 7/1987 | Thomson | 250/370 |
| 4,700,070 | 10/1987 | Kovac | 250/304 |

FOREIGN PATENT DOCUMENTS 1191982 5/1970 United Kingdom ................ 250/253

OTHER PUBLICATIONS

McCorkell et al., "An Apparatus for the Measurement of the Rates of Emanation of Radon from Rock Specimens and Powders," *Rev. Sci. Instrum.*; vol. 51(4), pp. 459–463 (1980).

Flynn, "The Determination of Low Levels of Polonium-210 in Environmental Materials," *Anal. Chim. Acta.*; vol. 43, pp. 221–227 (1968).

At Ease Radon Monitor, Models 1020 and 1021, Sun Nuclear Corporation (not dated).

Model 100 CIRAS System, Alpha Nuclear (not dated).

(List continued on next page.)

Primary Examiner—Janice A. Howell
Assistant Examiner—Richard Hanig
Attorney, Agent, or Firm—Venable, Baetjer and Howard

[57] ABSTRACT

A radon detection system is provided with the capability of monitoring certain environmental parameters together with certain other conditions indicative of possible tampering. The environmental data allows the calculation of an accurate projection of average long-term radon levels in the structure under test on the basis of a relatively short measurement period, while the tamper data indicates whether an attempt has been made to tamper with the detection unit or the measurement conditions during the test period. When an indication of possible tampering occurs, the system enters an accelerated data collection mode during which data is gathered that can later be used to determine whether tampering has actually occurred. The detection system may be provided with first and second detectors for separately monitoring airborne levels of radon gas and radon decay products. The radon gas detector may include a scintillation cell, and means may be provided to purge and then bypass the scintillation cell when high radon gas concentrations are detected. Methods for measuring and reporting radon gas and decay product concentrations are also disclosed.

73 Claims, 13 Drawing Sheets

OTHER PUBLICATIONS

Series 500 Alpha Prism System, Alpha Nuclear (not dated).
EDA Model RD-200 Portable Radon Detector, EDA Instruments Inc. (not dated).
EDA Model RDA-200 Radon/Radon Daughter Detector, EDA Instruments Inc. (not dated).
EDA Model WLM-30 Working Level Monitor, EDA Instruments, Inc. (not dated).
EDA Model RGA-40 Radon Gas Monitor, EDA Instruments Inc. (not dated).
EDA Instrument Inc., Price List (Sep. 1987).
Pylon Model AB-5 Portable Radiation Monitor, Pylon Electronic Development Company, Ltd. (not dated).
Pylon Models AEP-25 and AEP-47 Alpha Detection Assemblies and Models BEP-25 and BEP-47 Beta Detection Assemblies, Pylon Electronic Development Company, Ltd. (not dated).
Pylon Model PRD-1 Passive Radon Gas Monitor, Pylon Electronic Development Company, Ltd. (not dated).
Pylon Model LCA-2 Lucas Cell Adaptor, Pylon Electronic Development Company, Ltd. (not dated).
Eberline Model WLM-1A/WLR-1A Radon Working Level Monitoring System and Model WLI-1A Working Level Monitor Interface, Ebeline Division, Thermo-Electron Corporation (not dated).
Radon Sniffer, Thomson & Nielsen Electronics Ltd. (not dated), and Price List (Nov. 1986).

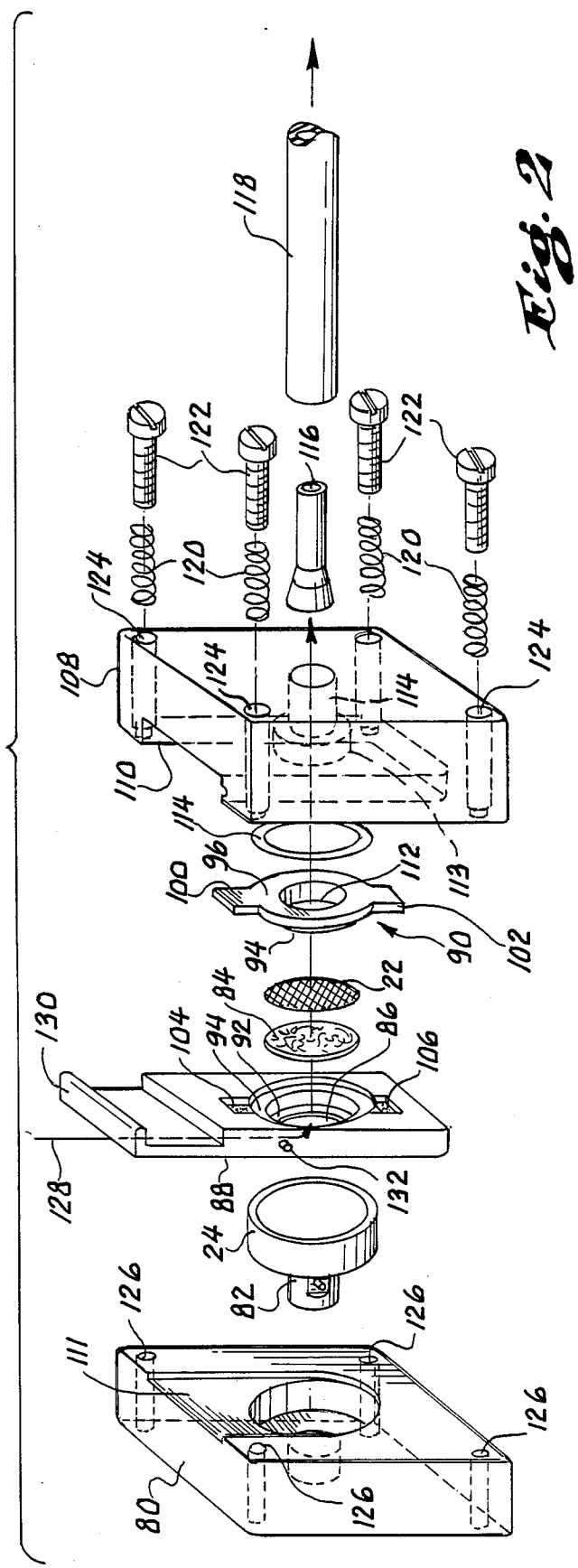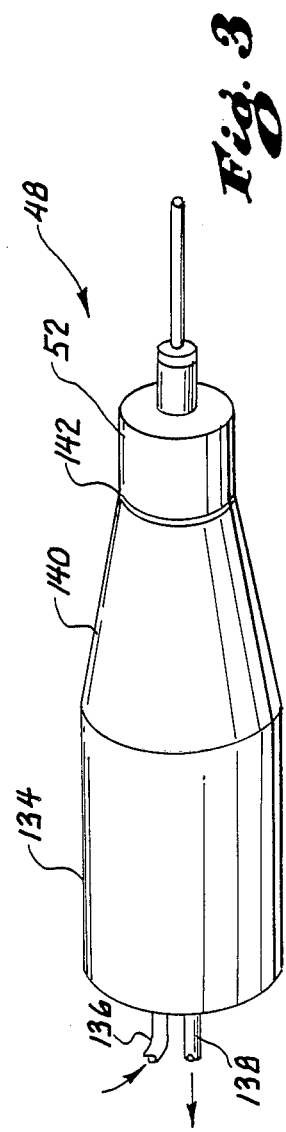

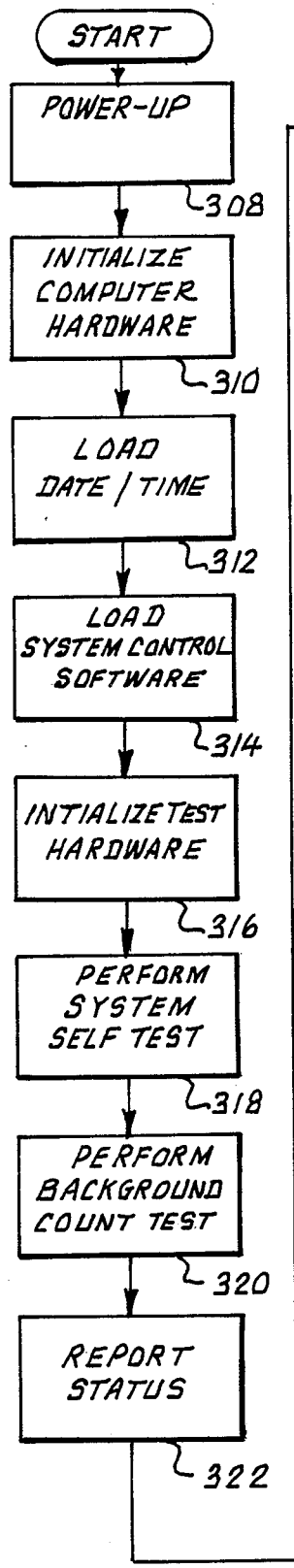
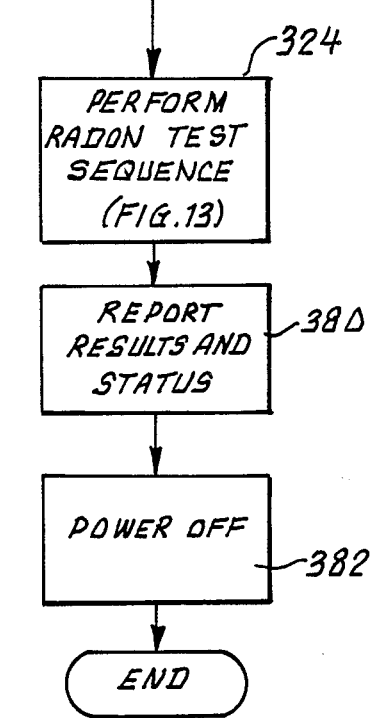
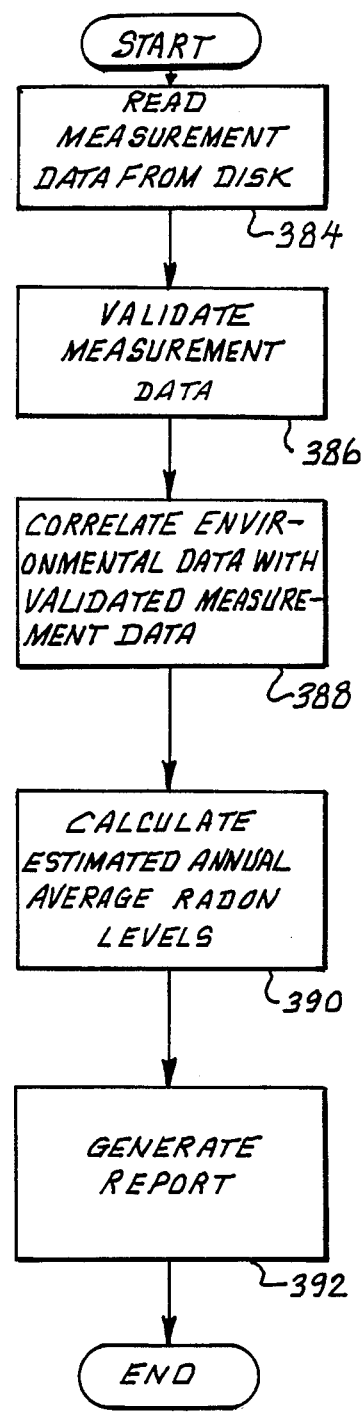
Fig. 12
Fig. 14

RADON DETECTION SYSTEM

BACKGROUND OF THE INVENTION

The present invention relates to apparatus and methods for detecting radon contamination, and is particularly concerned with a radon detection system incorporating environmental monitoring and tamper detecting capabilities to enhance the accuracy and reliability of radon level measurements.

In recent years, the infiltration of radon gas into homes and other structures has been recognized as a significant health risk. Radon 222 is a colorless, odorless gas which is produced by the natural decay of underground uranium deposits. The decay products of radon gas, principally radon A (polonium 218) and radon C' (polonium 214), attach to airborne dust particles which in turn can become lodged in the lungs. It is believed that prolonged exposure to these particles can lead to lung cancer.

Although measurable levels of radon gas can be found virtually everywhere, indoor environments are of particular concern. If a significant amount of radon gas is present at the site and is able to penetrate into the structure, indoor radon concentrations can reach dangerously high levels. Under present guidelines, an average radon gas concentration in excess of 4 picoCuries per liter of air is regarded as sufficient to require that corrective action be taken. Usually, such action involves providing additional ventilation or taking steps to prevent the entry of radon gas into the structure.

A number of continuous monitoring systems have been developed for measuring radon levels in underground mines and other environments in which high levels of radon contamination have been observed. However, these systems are not cost-effective for widespread radon testing in homes and other structures, since they are often quite complex and must be operated by trained personnel to insure proper set-up and calibration. For this reason, home radon testing has generally been carried out using a simple passive device consisting of a canister of activated charcoal which is exposed to the ambient air inside the structure to be tested. The canister is left in place for a predetermined amount of time, during which the charcoal adsorbs radon gas from the surrounding air. At the completion of the test period, the canister is removed from the structure and placed in a gamma counter to determine the amount of radon gas adsorbed. Based on the observed count and the length of time the canister was left in place, an estimate can be made of the average radon gas concentration in the structure during the measurement period.

Unfortunately, the use of charcoal canisters for radon detection has a number of drawbacks. For example, since moisture adsorption by the charcoal in the canister will affect the amount of radon gas which can be adsorbed, the measured radon concentration will vary with ambient humidity conditions unless a correction factor is applied. A correction factor is also required in order to account for the time elapsed between the completion of the test period and the time at which the gamma count is obtained. Another problem is that the canister responds very slowly to changes in ambient radon gas levels, and must be left in place for an extended period of time (typically 2 to 4 days) in order to obtain a reasonably accurate measurement. At the end of the test period, the canister yields only a single count representing the average radon gas concentration during the test period, whereas actual radon levels often vary drastically during the course of a day and on a seasonal basis. This count represents only the concentration of radon gas, which is harmless in itself, and does not reflect the concentration of radon decay products which constitute the actual health risk. Although the concentration of radon decay products (referred to as the radon working level) can be inferred from the measured radon gas concentration under conditions of equilibrium, such conditions are not usually present. Factors such as varying rates of radon gas infiltration, changing ventilation, and the use of home air filters to remove airborne dust particles can disrupt the equilibrium between radon gas and decay product concentrations.

A particularly serious problem with the use of charcoal canisters is their susceptibility to tampering. In the typical situation in which the radon gas level s being checked as part of a real estate transaction, there is a strong incentive on the part of the seller to take steps to lower the measured radon concentration if possible. This can be done quite easily by opening a door or window to increase the ventilation in the area being tested, or by moving the canister outdoors during part of the test period. In most cases, there is no way to verify that tampering has not occurred when the canister is retrieved for measurement, and hence the measured radon level cannot be regarded as completely reliable.

Several proposals have been made for detecting or preventing tampering with charcoal canisters. These have included relatively simple expedients such as sealing doors and windows, and marking the precise position of the canister in order to verify that it has not been moved during the test period. The use of air movement sensors and canister motion sensors has also been suggested, and the use of tracer gases has been proposed as a means for detecting patterns of air movement and the extent to which outside air has entered the measurement area. Unfortunately, however, these techniques are capable of detecting only a few of the more common types of tampering. Moreover, because the canister provides only a single measurement indicative of the average radon gas concentration during the test period, the occurrence of a momentary condition that may or may not indicate tampering, such as movement of the canister, cannot be correlated with instantaneous radon level measurement to determine whether tampering has actually occurred. Thus, the measurement data must be regarded as invalid whenever a possible tamper-indicating condition has occurred during the test period, even if the condition was a momentary or accidental disturbance having no effect on measured radon levels. This results in the loss of valid measurement data and requires that the test be repeated even though no actual tampering has occurred.

SUMMARY OF THE INVENTION

In accordance with the present invention, the limitations of the prior art are avoided by means of a radon detection system which operates to continuously measure and record airborne radon levels together with the contemporaneous values of certain environmental parameters which can affect radon levels. These parameters can be subsequently correlated with the measured radon levels in order to accurately project the average long-term or annual radon concentration in the structure under test on the basis of a relatively short measurement period. To further enhance the reliability of the measurement, certain tamper-indicating conditions are also monitored and recorded along with the measured radon levels and environmental parameters. By monitoring these tamper-indicating conditions continuously and correlating the monitored values with contemporaneous radon level measurements, it is possible to distinguish between instances of actual tampering and momentary or accidental disturbances which do not affect measured radon levels.

In accordance with one aspect of the present invention, therefore, a radon detection system is provided which comprises first means for measuring an airborne radon level, second means for monitoring at least one additional environmental parameter other than radon level, and recording means connected to the first and second means for recording on a common recording medium the measured radon level and the contemporaneous value of the additional environmental parameter. Preferably, the additional environmental parameter is selected from the group consisting of barometric pressure, temperature and humidity, and the common recording medium comprises a machine-readable recording medium, such as a magnetic diskette, random access memory, or other type of memory device. As used herein, the term "radon level" refers broadly to the level of radon gas or to the level of one or more radon decay products, or to both, as the context permits.

In accordance with another aspect of the present invention, a radon detection system is provided which comprises first means for measuring an airborne radon level, second means for monitoring at least one additional parameter indicative of possible tampering, and recording means connected to said first and second means for recording on a common recording medium the measured radon level and the contemporaneous value of the additional parameter. In the preferred embodiment, the additional parameter is selected from the group consisting of barometric pressure, temperature, humidity, motion, shock, tilt, proximity, ambient light, and power interruption. Additional tamper-indicating conditions include the ratio between the measured levels of radon gas and radon decay products or between the measured levels of two different radon decay products, in instances where these levels are separately measured, and the differential pressure across a filter used for collecting the airborne radon decay products.

In a particularly preferred embodiment of the invention, the detection of a condition indicative of possible tampering causes the system to enter an accelerated data collection mode. In this mode, the radon levels and tamper conditions are measured and recorded more frequently. This provides detailed information on events occuring immediately after the initial detection of possible tampering, so that the likelihood of actual tampering can either be confirmed or ruled out when the recorded data is subsequently analyzed.

In accordance with a further aspect of the invention, a radon detection system is provided for separately and continuously monitoring airborne levels of radon gas and of at least one airborne radon decay product. The detection system comprises an air flow path, means for maintaining a continuous flow of air in the air flow path, a particulate filter in the air flow path for removing and collecting at least one radon decay product from the air flow, a first detector for detecting the radon decay product collected by the particulate filter, and a second detector for detecting radon gas in the filtered air exiting from the particulate filter. Separate detection of radon gas and radon decay product concentrations provides additional information regarding radon contamination in the structure under test, and also provides an indication of whether certain types of tampering are likely to have occurred during the test period. In a preferred embodiment of the invention, the second detector comprises a scintillation cell through which the air flow passes, and means are provided for purging and then bypassing the scintillation cell in order to avoid cell contamination when high concentrations of radon gas are detected.

Additional aspects of the present invention include the operation of a radon detection system in a high flow rate mode at the beginning of a test period in order to establish accurate baseline values for the radon level measurements, provision for selectively interconnecting the measurement channels of a radon detection system to allow different types of measurement data to be obtained at different times, provision for monitoring the pressure drop across a particulate filter in a radon detection system in order to detect broken, clogged or missing filters, and a novel filter construction permitting rapid replacement of the filter element through the use of a slide-out filter holder. The present invention is also directed to methods which can be carried out using the exemplary apparatus disclosed and claimed herein.

BRIEF DESCRIPTION OF THE DRAWINGS

The various objects, advantages and novel features of the invention will be more readily apparent from the following detailed description when read in conjunction with the appended drawings, in which:

FIG. 2 is an exploded view of the filter/detector unit used in FIG. 1;

FIG. 3 illustrates the scintillation cell used in FIG. 1;

FIGS. 12 and 13 are flow charts illustrating the sequence of operations carried out by the on-board microprocessor of the radon detection system; and FIG. 14 is a flow chart illustrating the manner in which the data recorded by the radon detection system may be analyzed and reported.

Throughout the drawings, like reference numerals should be understood to refer to like components.

DETAILED DESCRIPTION OF THE PREFERRED EMBODIMENT

Figure 1:
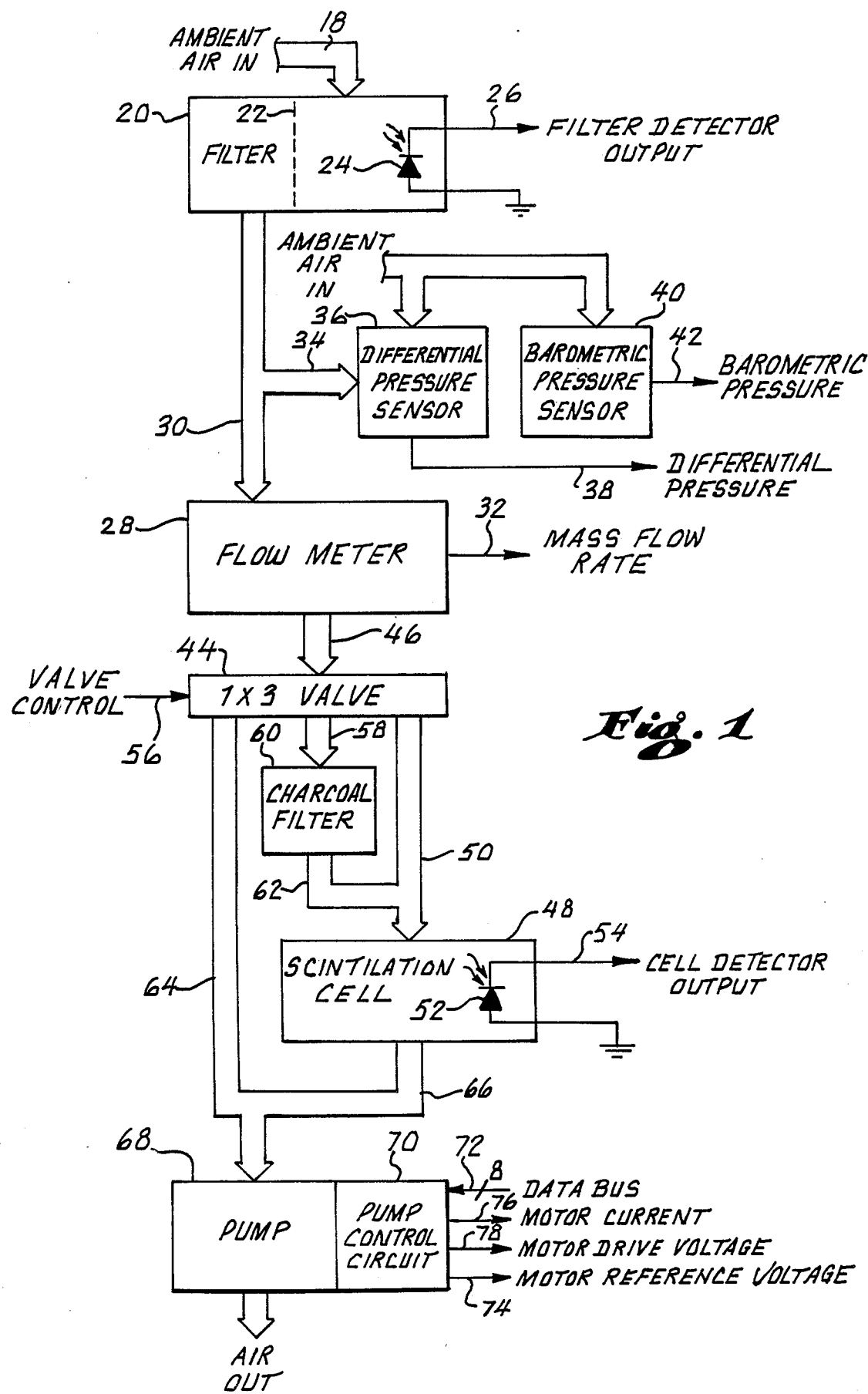
FIG. 1 is a schematic diagram illustrating the air flow path through a continuous radon detection system constructed in accordance with the present invention.

FIG. 1 illustrates the air flow path through a continuous radon detection system constructed in accordance with the present invention. The components shown in FIG. 1, together with associated measurement, control and recording circuitry to be described hereinafter, may be incorporated into a portable unit that can be transported to structures in which it is desired to check for radon contamination. The system operates autonomously to continuously measure and record changing concentrations of radon gas and radon decay products over time, together with the contemporaneous values of certain additional environmental parameters which can affect radon levels, such as barometric pressure, temperature and humidity. These additional parameters allow accurate prediction of the average annual or long-term radon concentration in the structure on the basis of a relatively short period of measurement, and also make it possible to detect attempts to tamper with the system or with the measurement environment. Tamper detection is further enhanced by monitoring certain additional parameters, as will be described hereinafter. The recorded radon concentrations and other data may be analyzed at a central location after the measurement period is complete, and used to generate a report providing the measured radon levels, projected average annual levels, and an indication of whether tampering is likely to have occurred.

The system illustrated in FIG. 1 utilizes a continuous flow of air in order to allow changes in radon gas and radon decay product concentrations over time to be detected and correlated with other parameters. The ambient air from the structure under test is drawn into the system through an air intake port 18 and enters a filter/detector unit 20 containing a microporous particulate filter 22. The filter element is preferably a Millipore Type AA filter having a 0.80 μm pore size. The gaseous portion of the air (including undecayed radon gas) and particles smaller than 0.8 μm pass through the filter 22, but particles larger than 0.8 μm are captured on the surface of the filter. It is these captured particles larger than 0.8 μm to which the radon decay products (also known as radon progeny or daughter particles) principally attach. The filter/detector unit 20 contains an alpha particle detector 24 which generates an electrical output on line 26. This output is representative of the alpha count of the radon decay products collected by the filter 22, and provides an indication of the radon working level in the structure being tested.

The filtered air exiting from the filter/detector unit 20, which contains radon gas but essentially no radon decay particles, enters a flow meter 28 through an air supply line 30. The flow meter 28 generates a voltage output on line 32 which is representative of the mass flow rate of air through the flow meter. A branch line 34 from the air supply line 30 connects the downstream side of the filter/detector unit 20 to a differential pressure sensor 36. The differential pressure sensor 36 compares the air pressure at the filter output with the ambient or barometric pressure, and generates a voltage output on line 38 which is representative of the pressure drop across the filter 22. The ambient pressure is sensed by a separate barometric pressure sensor 40 which generates a voltage output on line 42 representing the prevailing barometric pressure within the structure.

From the output of the flow meter 28, the air flow enters a three-way distributing valve 44 through an air supply line 46. The valve 44 may consist of a type MB valve and type MW manifold sold by Mead Corporation. During the normal operation, the valve 44 routes the air to a scintillation cell 48 through an air supply line 50. The scintillation cell 48 contains a radon gas detector 52 which generates an electrical output on line 54. This output is representative of the number of radon decay particles that have been created during the residence time of the air in the scintillation cell 48, and provides an indication of the radon gas concentration in the structure being tested.

When the environment in which a radon test is being conducted is found from initial measurements to have extremely high levels of radon present (i.e., in excess of about 20 picoCuries per liter of air) it may be desirable to discontinue use of the scintillation cell 48 in order to prevent cell contamination. The system is then able to enter a purging mode in which the scintillation cell 48 is cleared of ambient air containing radon gas. The purging mode eliminates the high background count that would otherwise result from elevated radon levels contaminating the cell. This allows the system to be used at another location immediately following the completion of the working level measurement.

To accomplish the purging capability, an electrical valve control signal is applied to the distributing valve 44 on the input line 56, causing the valve to divert the air flow from line 50 to a branch line 58. The branch line 58 routes the air flow to a charcoal filter 60 which removes substantially all radon gas from the air. The filtered air exits the charcoal filter 60 and enters the scintillation cell 48 via air supply lines 62 and 50, displacing most of the radon gas remaining in the cell 48. After approximately 10 volumes of filtered air have passed through the scintillation cell 48, a signal is applied to the valve control input 56 to cause the valve 44 to bypass both the scintillation cell 48 and the charcoal filter 60 by routing the air flow to a bypass line 64. The purge and bypass functions are not essential to the operation of the radon detection system, and may be omitted by deleting the valve 44, charcoal filter 60, and the air supply lines 58, 62 and 64.

With continued reference to FIG. 1, both the bypass line 64 leading from the valve 44 and the air supply line 66 leading from the output of the scintillation cell 48 are connected to the input of a diaphragm-type positive displacement pump 68 which maintains a positive flow of air through the radon detection system. A suitable diaphragm pump is available from Gilian Instrument Company under part number 800368. The pump speed is controlled by a pump control circuit 70 in order to maintain a constant rate of air flow. The pump motor speed is controlled by a motor reference voltage which is generated by the pump control circuit 70 in response to inputs from the system data bus 72. The motor reference voltage appears as an output on line 74. Two additional voltage outputs representing the pump motor current and drive voltage appear on lines 76 and 78, respectively.

FIG. 2 is an exploded view of the filter/detector unit 20 used in the radon detection system of FIG. 1. An alpha detector housing 80 secures and maintains the alpha detector 24 in the desired position. The alpha detector 24 is a PN diode having a 490 mm$^2$ circular area. A suitable device is available from Quantrad Corporation under part number 500-PNC-BNC. A standard BNC connector 82 is attached to the alpha detector 24 to provide an electrical output corresponding to the filter detector output 26 of FIG. 1. The filter element 22 is carried by a foraminous support layer 84 and is mounted in an aperture 86 formed in a removable filter holder 88. The filter element 22 and support layer 84 are secured between a retaining ring 90 and a lip 92 formed at the periphery of the aperture 86. The retaining ring 90 includes a cylindrical projection 94 which fits in the aperture 86 and a flange 96 which fits in a correspondingly shaped recess 98 formed in the filter holder 88. The flange 96 includes upper and lower metallic tabs 100, 102 which are received in correspondingly shaped areas of the recess 98 and are held by embedded magnets 104, 106. The tabs 100, 102 and magnets 104, 106 afford a quick-release coupling between the retaining ring 90 and filter holder 88. As an alternative to the magnetic coupling, the retaining ring 90 and filter holder 88 may be attached by means of screws which pass through holes in the ring 90 and engage threaded holes in the holder 88. As a further alternative, the cylindrical portion 94 of the retaining ring 90 may be externally threaded and the aperture 86 of the filter holder 88 may be formed with mating internal threads, so that the retaining ring may be unscrewed from the filter holder when it is desired to replace the filter element 22.

The filter holder 88 is held between the alpha detector housing 80 and a mating air exhaust housing 108 and is slidably received in a vertical slot 110 formed in the housing 108. A second vertical slot 111 is formed in the alpha detector housing 80 to provide a gap between the adjacent surfaces of the alpha detector housing 80 and filter holder 88. This gap corresponds to the air inlet port 18 of FIG. 1. The surface of the filter element 22 is approximately 0.2 inches from the surface of the alpha detector 24 and is parallel to it. The filter element used has a 1-inch diameter surface (corresponding to an area of about 0.8 square inch) and is aligned with an aperture 112 in the retaining ring 90. The size of the lip 92 is such that the center 0.6 square inch of the filter surface collects the particulate. The aperture 112 is aligned with an aperture 113 of similar diameter in the air exhaust housing 108. An O-ring 114 is compressed between the flange 96 of the retaining ring 90 and a circular groove (not shown) formed in the face of the slot 110 to serve as a seal between the two apertures 112 and 113. The aperture 113 communicates with a smaller-diameter aperture 114 which receives an air tubing connector 116. The air tubing connector serves as the outlet of the filter/detector unit 20 and is attached to a length of flexible tubing 118 which corresponds to the air supply line 30 of FIG. 1. The air exhaust housing 108 is connected to the alpha detector housing 80 by a set of springs 120 and screws 122. The threaded portions of the screws 122 pass through holes 124 in the air exhaust housing 108 and engage smaller-diameter threaded holes 126 in the alpha detector housing 80. The springs 120 surround the threaded portions of the screws 122 and are compressed within the holes 124 in order to draw together the alpha detector housing 80 and the air exhaust housing 108.

As indicated by the arrow 128 in FIG. 2, the air flow enters the filter/detector unit 20 vertically through the slot 111, travels horizontally through the filter element 22 and support layer 84, and then exits the exhaust housing 108 through the connector 116 and tubing 118. Removal and replacement of the filter element 22 may be accomplished by sliding the filter holder 88 vertically out of the slot 110 and removing the retaining ring 90. This is preferably accomplished by mounting the filter/detector unit 20 so that the filter holder 88 is removable through a slot in the front panel of the radon detection unit. The filter holder 88 is provided with a handle 130 to facilitate its removal from the slot 110. A raised boss 132 is formed on the side of the filter holder 88 and engages a vertical channel in the side of the slot 110 to insure that the filter holder is inserted in the proper orientation.

FIG. 3 illustrates the scintillation cell 48 used in the radon detection system of FIG. 1. A suitable scintillation cell is available from Rocky Mountain Scientific under part number RA 300. Air enters the scintillation cavity 134 through an air inlet port 136 and exits through an air outlet port 138. The interior walls of a scintillation cavity 134 are coated with a fluorescent material such as zinc sulfide, which produces flashes of light in the visible and ultraviolet spectra when impinged by alpha particles resulting from radon-gas decay. The air entering the scintillation cavity 134 has previously passed through the filter 22 where substantially all dust particles and radon decay products were removed. Therefore, the air as it enters the scintillation cavity 134 contains essentially undecayed radon gas. During the residence time of the radon gas in the scintillation cavity, a small amount of the radon gas decays into radon A (polonium 218). Radon A is the initial decay product of radon 222 gas and has a half-life of 3.05 minutes. Some of these unattached radon decay products deposit on the interior walls of the scintillation cavity 134 and decay further, producing light pulses in the ultraviolet and visible spectra. In addition to radon A, the other major decay product of radon 222 gas that gives rise to alpha particle emissions is radon C' (polonium 214), which has a half-life of 164 microseconds. Thus, the total output of the scintillation cell 48 is approximately equal to the sum of radon A and radon C' alpha emissions.

Attached to one end of the scintillation cell cavity 134 is a frusto-conical optical prism 140, which focuses the light emissions from the scintillation cavity 134. Mounted at the narrow end of the optical prism 140 is the radon gas detector 52, which in the preferred embodiment comprises an ultraviolet-sensitive photodetector (Quantrad Corporation part number 500-PNC-BNC) with a surface area of 490 mm$^2$. A layer 142 of lubricant consisting of silicone oil (Dow Corning DC 200 or the equivalent) is applied between the optical prism 140 and the photodetector 52 to provide efficient light coupling. In the preferred embodiment, the scintillation cavity 134 has an interior volume of 125 milliliters and the rate of air flow through the system is 250 milliliters per minute. As will be described, the air flow rate may be increased to 500–750 milliliters per minute during start-up operation in order to obtain baseline radon level measurements for the structure under test.

Figure 4:
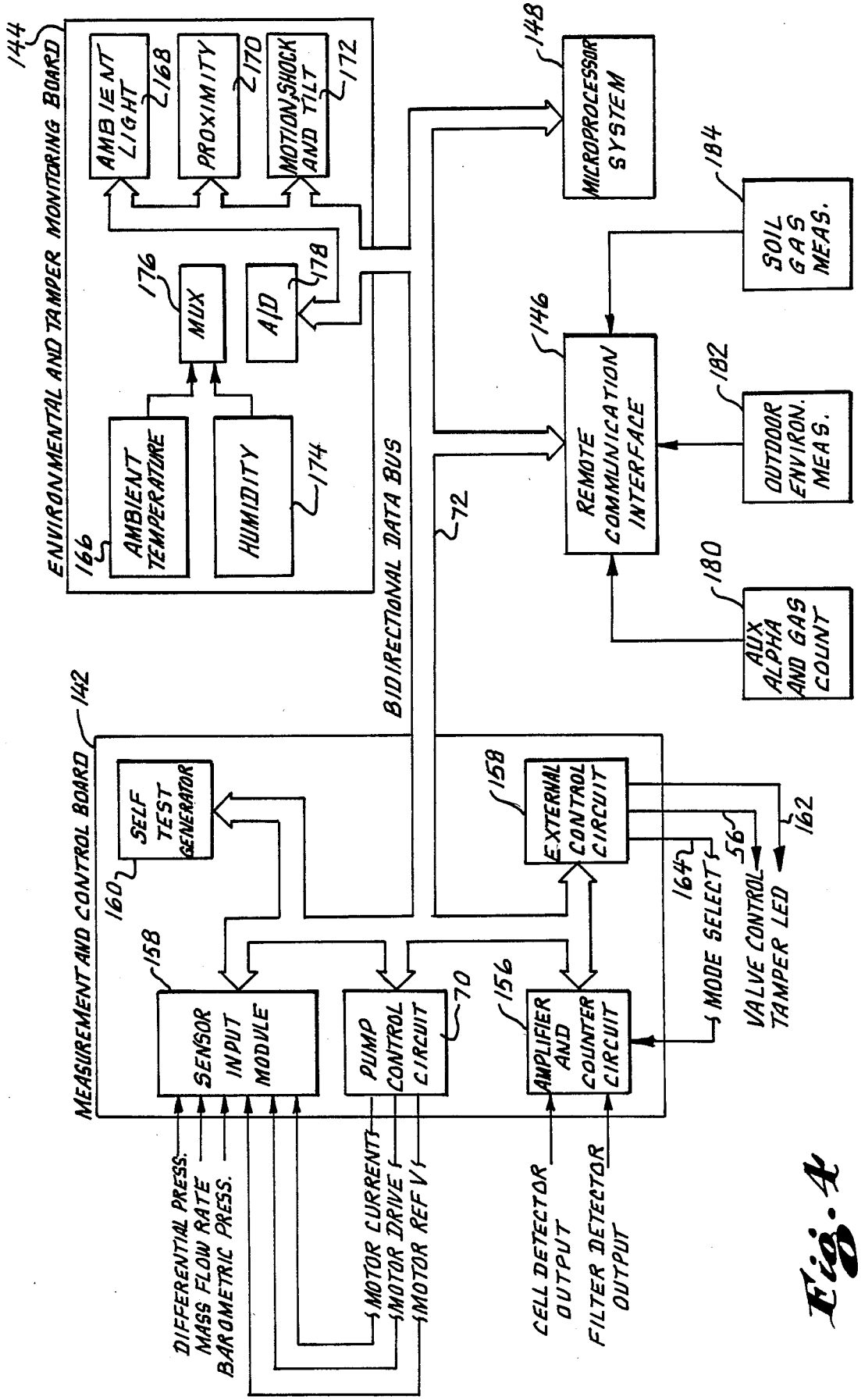
FIG. 4 is a block diagram illustrating the major electrical components of the radon detection system.

FIG. 4 is a block diagram illustrating the major electrical components of the radon detection system. These components include a measurement and control board 142, an environmental and tamper monitoring board 144, a remote communication interface 146, a microprocessor system 148, and a bidirectional data bus 72 interconnecting the other major components. The data bus 72 includes data, address and control lines, as well as buffers, decoders, and other devices necessary for allowing communication among the components of FIG. 4.

The measurement and control board 142 includes the pump control circuit 70, a sensor input module 154, an amplifier and counter circuit 156, an external control circuit 158, and a self-test generator 160. The pump control circuit 70, to be discussed in more detail in connection with FIG. 9, converts digital speed control commands on the data bus 72 to an analog reference voltage which controls the speed of the pump motor. Two analog outputs 76 and 78, representing the pump motor current and drive voltage, respectively, are generated by the pump control circuit 70. These two outputs 76 and 78, together with the analog reference voltage 74, are applied as inputs to the sensor input module 154.

The sensor input module 154 serves as an interface with the data bus 72 and receives as inputs certain additional signals produced by the components of FIG. 1, namely, the differential pressure 38, mass flow rate 32, and barometric pressure 42. The sensor input module 154 will be discussed in more detail in connection with FIG. 10.

The amplifier and counter circuit 156 of FIG. 4 receives as inputs the two radon level outputs generated in FIG. 1, specifically, the output signal 54 from the scintillation cell 48 and the output signal 26 from the filter/detector unit 20. These two signals are amplified, counted and formatted for transmission on the data bus 72 by the amplifier and counter circuit 156.

The external control circuit 158 receives digital data from the data bus 72 and produces output signals on lines 56, 162 and 164 which are used to control certain external devices. The signal on line 56 controls the distributing valve 44 of FIG. 1, which causes the scintillation cell 48 to be purged and/or bypassed as described earlier. The output on line 162 operates a panel-mounted light-emitting diode (LED) to provide a visual indication that a condition indicative of possible tampering has been detected. The output on line 164 is a mode select signal which operates a relay in the amplifier circuit of FIG. 5 for a purpose to be described shortly.

The self-test generator 160 initiates a number of self-test and calibration routines which are used for initial set-up of the radon detection system, establishment of background radiation counts, and identification of fault conditions. Examples of fault conditions which are isolated by the self-test generator 160 include malfunctioning electrical modules, broken or clogged filters, abnormal pump performance, and defective sensors.

With further reference to FIG. 4, the function of the environmental and tamper monitoring board 144 is to monitor certain environmental parameters that may affect radon levels. In the illustrated embodiment, the selected parameters are humidity and ambient air temperature. Barometric pressure, the predominant environmental parameter affecting radon levels, is separately monitored by the measurement and control board 142 as described earlier. Environmental monitoring of barometric pressure, temperature, and humidity will allow a data base to be created that accurately predicts in a short term test (i.e., one to two days) the annual average radon concentration in a given structure. Other environmental factors, such as wind conditions and ground cover during the test period, may also be taken into account. The environmental and tamper monitoring board 144 also monitors certain conditions that may indicate tampering, including motion, shock, tilt, ambient light level, and proximity. The detection of such conditions prevents surreptitious alteration of the measurement conditions (or of the detection system itself) in an attempt to insure a favorable report. Environmental parameters such as barometric pressure, humidity and ambient temperature, as well as system parameters such as the differential pressure across the particulate filter 22, can also provide an indication of possible tampering under certain circumstances.

In order to accomplish the functions described above, the environmental and tamper monitoring board 144 includes a number of discrete sensors which provide data to the data bus 72. One of these is an ambient temperature sensor 166 which senses the temperature of the ambient air in the vicinity of the radon detection unit. A suitable temperature sensor is available from Thermo-Metrics under part number B35JA202G. In addition to allowing better prediction of long-term radon levels, ambient temperature information can provide an indication of tampering in situations where a window or door is opened in an attempt to ventilate the structure being tested. Tampering may be also indicated by sudden changes in ambient light which occur at unexpected times, as for example when a light is turned on during the middle of the night or when the radon detection unit is covered during daylight hours. For this reason, an ambient light sensor 168 is provided to detect changes in ambient light in the vicinity of the radon detection unit. This sensor may be of the type available from EG&G under part number UV 040BG. A proximity sensor 170 is also provided to detect changes in the position of objects within a predetermined radius of the radon detection unit, a condition which is likely to precede an attempt at tampering. A suitable sensor is available from Honeywell under part number SDP8425. A motion, shock and tilt sensor 172 is provided to detect any attempt to move the radon detection unit from its initial position after it has begun operating. This will effectively defeat any attempt to alter the measurement conditions by moving the unit outdoors or to some other location where lower radon levels are likely to exist, such as near an open window. The motion, shock and tilt sensor may consist of a Signal Systems International series 2009 device. Finally, a humidity sensor 174 is provided on the environmental and tamper monitoring board 144 in order to measure the relative humidity at the location of the radon detection unit. A humidity sensor manufactured by Sharp under part number ORO5HM1 may be employed for this purpose. Humidity information is useful in predicting long-term radon levels, and sudden changes in humidity may indicate an attempt to tamper with the measurement conditions by ventilating the structure under test. The humidity sensor 174 and ambient temperature sensor 166 produce analog outputs and are connected to the data bus 72 by means of a multiplexer 176 and an analog-to-digital converter 178. The remaining sensors produce digital outputs which are latched by the sensor circuitry and applied directly to the data bus 72.

Certain tamper-indicating conditions other than those detected by the environmental and tamper monitoring board 144 are also monitored by the present system. For example, an abrupt increase in the differential pressure across the particulate filter 22 may indicate that the air intake port 18 of the radon detection unit has been purposely obstructed with a cloth or other covering intended to filter the air. Other parameters that may indicate tampering are the ratio between the measured concentrations of radon gas and radon decay products, and the ratio between the measured concentrations of two different radon decay products (e.g., radon A and radon C'). Abrupt changes in these ratios may indicate tampering by ventilating the structure under test or by filtering the air before it is drawn into the air intake port 18 of the radon detection unit. Power interruptions may also indicate that tampering has been attempted, as for example by attaching a power cord extension to the radon detection unit so that it can be moved outdoors or to some other location where radon levels are likely to be lower, such as near an open window. The system may be programmed to record the time that power is interrupted and restored, and this information can be compared with local power company records to determine whether the power interruption was the result of tampering.

Since the presence of one or more tamper-indicating conditions does not necessarily indicate actual tampering, the radon detection system is programmed to continue to monitor and record radon levels and other parameters after a tamper-indicating condition has occurred. The recorded data can then be examined to determine whether tampering is likely to have occurred. However, the occurrence of certain tamper-indicating conditions causes the system to immediately enter an accelerated data collection mode in which radon levels and other measured parameters are recorded more frequently. This provides a more extensive body of data which can be analyzed to determine what occurred immediately after the initial tamper-indicating condition was detected. If certain additional tamper-indicating conditions are detected, tampering can usually be confirmed and subsequent radon level measurements may then be discarded as invalid. If no additional tamper-indicating conditions are detected, the possibility of tampering may be discounted and the radon level measurements may be treated as accurate and used in computing an estimated annual radon level for the structure under test.

With further reference to FIG. 4, the radon detection system also includes a remote communication interface 146. The remote communication interface 146 allows additional parameters to be measured by remote sensors in order to acquire additional data that may affect radon levels in the structure being tested. In the illustrated embodiment, this additional data is provided by an auxiliary alpha and gas count module 180, an outdoor environmental measurement module 182, and a soil gas measurement module 184. The auxiliary alpha and gas count module 180 can be used to provide an additional measurement of radon gas and decay product levels for comparison with the values generated by the detectors 24 and 52 of FIG. 1. These values may be taken at a location different from the location of the radon detection unit. The outdoor environmental measurement module 182 allows the system to separately monitor various outdoor weather conditions (e.g., temperature, barometric pressure, humidity and wind conditions) to allow further comparison and correlation with indoor data. Other outdoor environmental conditions that may affect radon levels but cannot easily be detected by sensors, such as the presence of snow, ice or other types of ground cover, can be observed visually and entered manually into the system by the operator. The soil gas measurement module 184 includes a measurement probe (not shown) for measuring soil porosity and concentrations of radon gas in the soil. Building site evaluations can be carried out using software routines that measure both soil porosity and radon flux concentrations.

In order to control the operation of the radon detection system and record the measured radon levels and other data, an on-board microprocessor system 148 is provided as illustrated in FIG. 4. The microprocessor system 148 incorporates an Intel 8088 microprocessor and exchanges data with the measurement and control board 142, environmental and tamper monitoring board 144, and remote communication interface 146 by means of the bidirectional data bus 72. The operation of the microprocessor system 148 will be described in more detail hereinafter in connection with the flowcharts of FIGS. 12–14.

Figure 5:
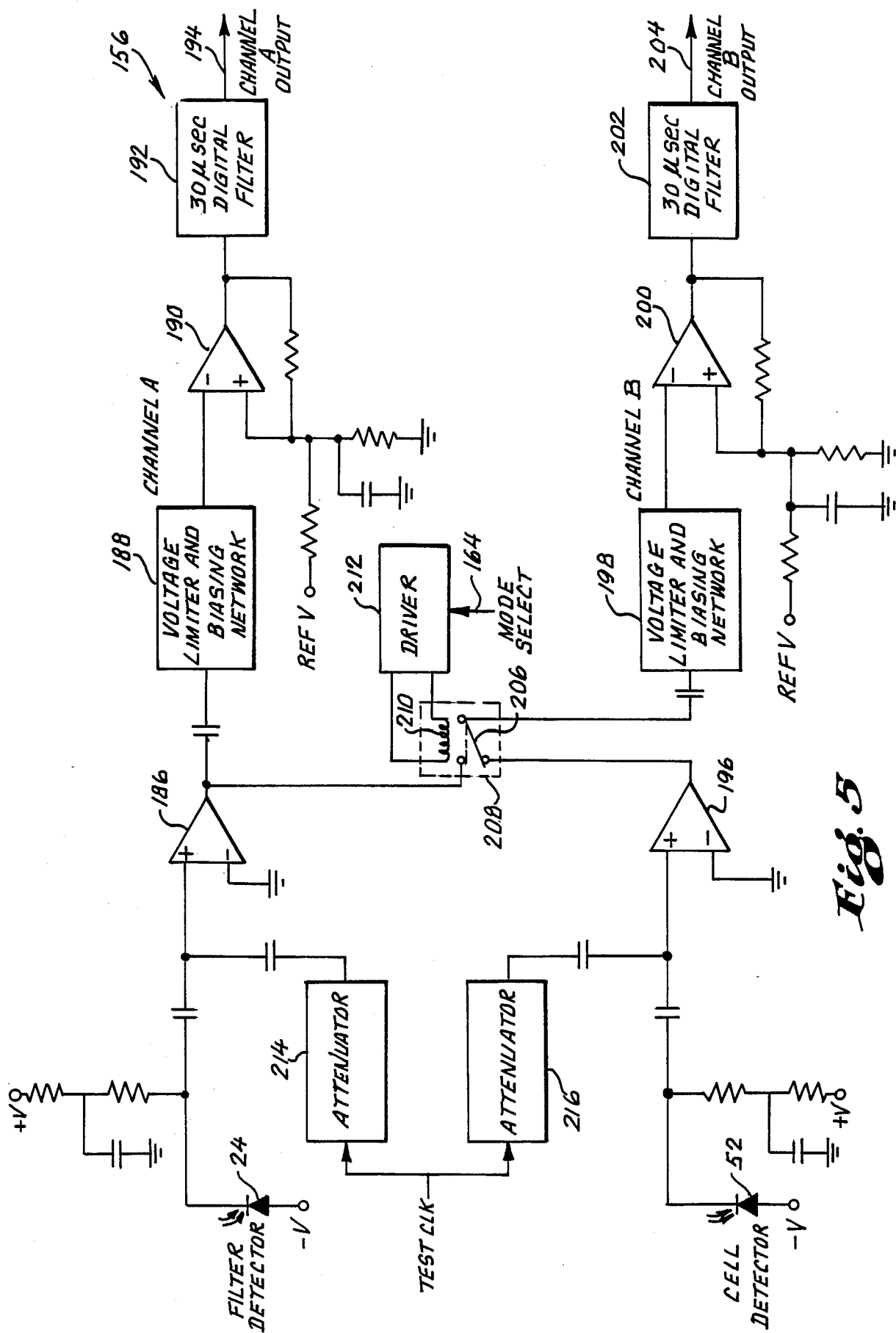
FIG. 5 is a schematic diagram of the amplifier circuit which receives the inputs of the filter and cell detectors.
Figure 6:
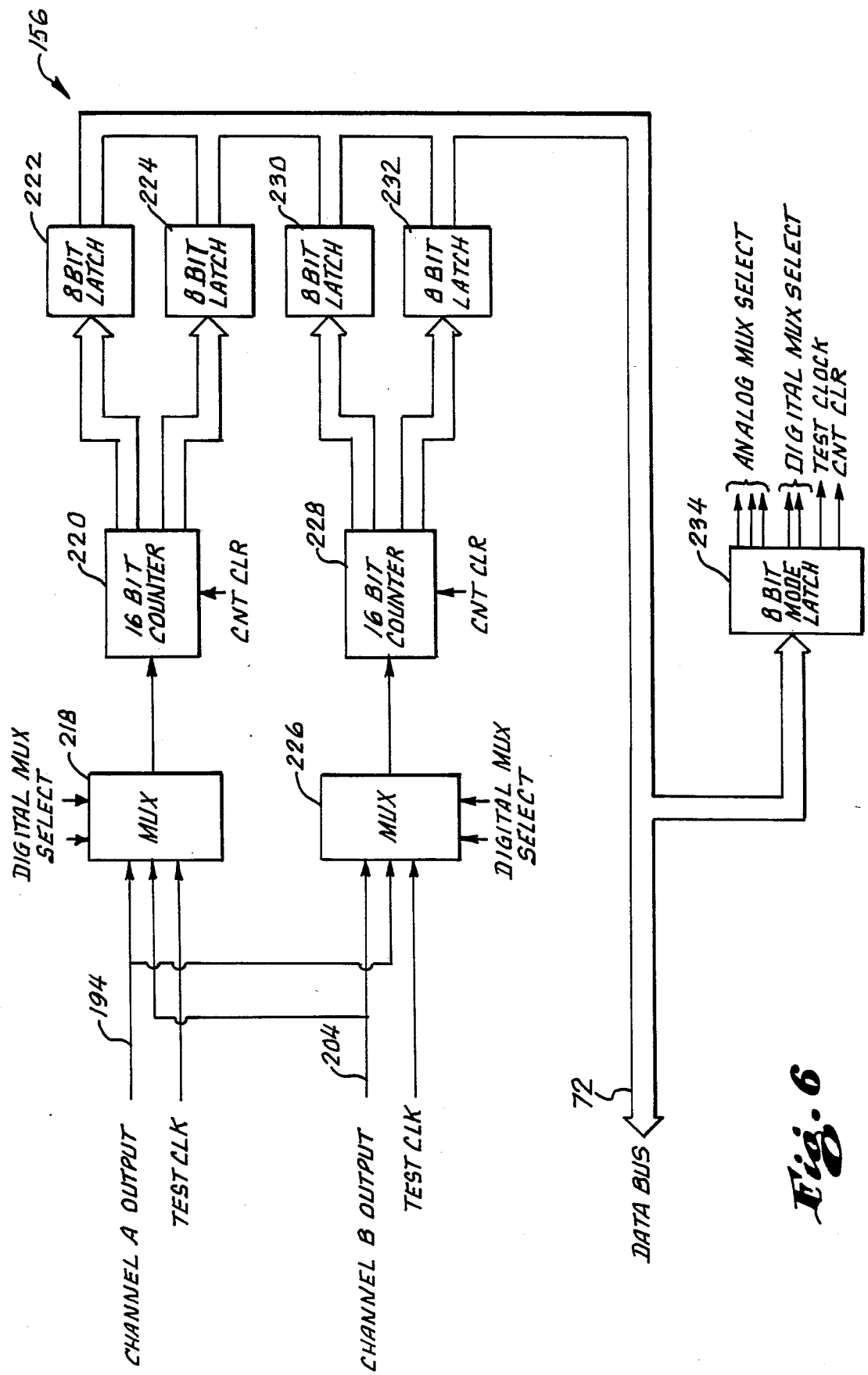
FIG. 6 is a schematic diagram of the counter circuit which is used with the amplifier circuit of FIG. 5.

FIGS. 5 and 6 illustrate in detail the amplifier and counter circuit 156 of FIG. 4. Referring first to FIG. 5, the outputs from the filter detector 24 and cell detector 52 are applied to the inputs of a pair of similar amplifier channels A and B. Alpha particles that are emitted from the surface of the filter element 22 in the direction of the alpha detector 24 penetrate into the PN junction area of the filter detector 24. The detector 24 is back-biased with 30 volts through a 1-megohm resistance. The back (leakage) resistance of the diode is decreased as a result of the alpha energy being absorbed in the detector junction area. This change is on the order of 100 $\mu V$ with a 10-$\mu$sec pulse width. This voltage change is AC-coupled into a multistage amplifier circuit 186 to yield an output signal on the order of a half a volt. The output of the amplifier circuit 186 is AC-coupled into a circuit 188 that limits the voltage excursion and applies a DC bias of about 0.8 volt. The conditioned signal is compared by a comparator circuit 190 with a bias signal of about 0.4 volt, to provide for a high noise rejection ratio. A small amount of positive feedback is inserted into the comparator reference input to provide noise-free switching. The output of the comparator circuit 190 is TTL-compatible and is applied to the trigger input of a retriggerable one-shot device 192. The time period of the one-shot output is set to 30 $\mu$sec. The retriggerable feature of the one-shot device insures that no output pulses are produced for a period of 30 $\mu$sec after an output detection from the comparator 190. In this way, any noise, ringing or other signal degradation associated with the detected pulse will not produce false alpha counts. The effect of this circuit is to act as a 30-$\mu$sec digital filter. The output 194 of the digital filter 192 constitutes the channel A output.

With further reference to FIG. 5, the cell detector 52 preferably comprises a solid state ultraviolet-sensitive photodetector for detecting light flashes caused by alpha strikes within the cavity 134 of the scintillation cell 48. The output of the cell detector 52 is applied to a multistage amplifier circuit 196, voltage limiter and biasing network 198, comparator 200, and 30-$\mu$sec digital filter 202. The components 196–202 are essentially identical to the corresponding components 186–192 of channel A. The output 204 of the digital filter 202 constitutes the channel B output.

During normal operation of the radon detection system, the output of the filter detector 24 is amplified by channel A and the output of the cell detector 52 is amplified by channel B. However, in situations where a radon gas count from the scintillation cell detector 52 is not desired, the contacts 206 of a relay 208 may be moved to the position shown in phantom in FIG. 5. In this position, the amplified input from the cell detector 52 is isolated, and the output from the multistage amplifier circuit 186 of channel A is applied in parallel to the input of the voltage limiter and biasing network 188 of channel A and to the input of the corresponding voltage limiter and biasing network 198 of channel B. In this condition, channel A can be used to produce an output representative of total alpha decay due to radon decay products (i.e., radon A and radon C'), and the biasing and reference voltages of channel B can be chosen so that the channel B output is representative of only radon C' alpha particles. This is possible since the energies associated with radon A decay and radon C' decay are 5.998 MeV versus 7.683 MeV, respectively, and hence a detection threshold in channel B of about 6–7 MeV will limit that channel to a radon C' alpha count. By subtracting the radon C' count from the total alpha count, a separate count for radon A can be obtained. Thus, with the relay contacts 206 in the position shown in phantom, it is possible to obtain separate radon A and radon C' counts from the filter detector 24. A coil 210 of the relay 208 is operated by a driver circuit 212, which is in turn controlled by a mode select signal 164 produced by the external control circuit 158 of FIG. 4 under the control of the microprocessor system 148. In this way, the functions of channels A and B can be selected automatically by the on-board microprocessor. If desired, the relay 208 can be replaced with a manually operated switch or with a jumper line that can be manually connected between the two channels.

For diagnostic testing purposes, a test clock signal is applied to the channel A and B inputs through attenuators 214 and 216. These signals can be used to simulate the outputs of the filter detector 24 and cell detector 52 in order to verify that the components of FIGS. 5 and 6 are operating properly. The attenuators 214 and 216 are needed since the level of the TTL test clock signals is much higher than that of the detector outputs, and must be reduced before being applied to the amplifier circuits 186, 196.

Referring now to FIG. 6, the outputs from the digital filters 192 and 202 of FIG. 5 are applied to the inputs of a pair of similar counter channels A and B. During normal operation, the channel A output 194 from the digital filter 192 is selected by a multiplexer 218 and is applied to the input of a 16-bit counter 220. The counter divides the received signal into upper and lower 8-bit counts which together represent the number of alpha decays detected by the filter detector 24. The upper and lower 8-bit signals from the 16-bit counter 220 are placed into identical 8-bit latches 222 and 224, respectively. The outputs of these two latches are connected to the microprocessor system 148 of FIG. 4 by means of the data bus 72. In a similar manner, the channel B output 204 from the digital filter 202 is applied to a multiplexer 226, a 16-bit counter 228, and two 8-bit latches 230 and 232. The components 226–232 of channel B are essentially identical to the corresponding components 218–224 of channel A. The count stored by the upper and lower 8-bit latches 230 and 232, representing the total alpha count detected by the cell detector 52, is transmitted to the microprocessor system 148 via the data bus 72 as described previously.

In situations where one or more of the components of counter channel A or B in FIG. 6 is not operative, the corresponding output 194 or 204 from digital filter 192 or 202 of FIG. 5 may be processed by the opposite counter channel to allow the system to continue counting the pulses generated by the filter detector 24 or cell detector 52. The switching of the counter channels A and B in FIG. 6 is performed by the mulitplexers 218 and 226, which select the appropriate input signal in response to a 2-bit digital multiplex select signal generated under microprocessor control by an 8-bit mode latch 234. The counter circuit of FIG. 6 is also capable of utilizing a test clock signal as an input to counter channels A and B in order to simulate detected signals for testing purposes. The mode latch 234, in addition to generating the digital multiplex select signal, also produces the test clock signal, a further signal used for clearing the counters 220 and 228, and a 3-bit analog multiplex select signal. The function of the analog multiplex select signal will be described hereinafter in connection with FIG. 9.

Figure 7:
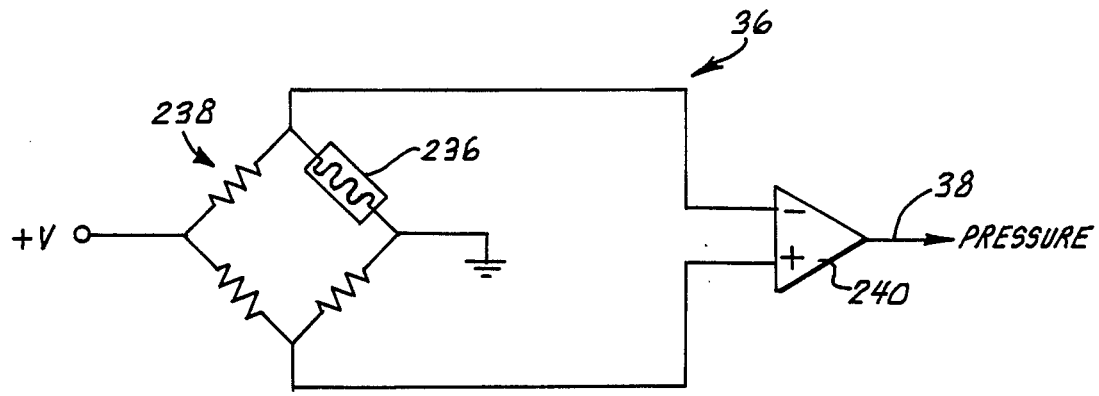
FIG. 7 is a schematic diagram of the circuit used for the differential and ambient pressure sensors of FIG. 1.

FIG. 7 illustrates the electrical circuit used to produce the differential pressure signal 38 of FIG. 1. Pressure variations that occur across the particulate filter 22 are sensed using a bellows assembly (not shown) incorporating a quartz strain gauge 236. A suitable device is available from the MicroSwitch Division of Honeywell under part number 176PC28HD2. The strain gauge 236 is connected in a resistive bridge circuit 238, as shown, and the bridge outputs are applied to the inputs of a differential amplifier circuit 240. A voltage proportional to the differential pressure across the bellows assembly is created at the bridge circuit outputs and amplified by the amplifier circuit 240 to produce an output indicative of the air pressure drop across the filter element 22. For some types of pressure sensors, a correction factor must be applied to the amplifier output in order to obtain the true differential pressure. This correction may be performed by the microprocessor 148 of FIG. 4 using stored correction factors.

The differential pressure signal 38 produced by the circuit of FIG. 7 may indicate air leakage across a newly installed filter assembly when compared to previously known pressure drops at equivalent flow rates. The differential pressure signal 38 may also be used to detect a clogged filter assembly, to detect a broken, misaligned or missing filter assembly due to operator error or device tampering, or to calculate relative flow rates which can be correlated with the output of the flow meter 28 of FIG. 1.

The barometric pressure signal 42 of FIG. 1 is produced by a circuit which is substantially identical to that shown in FIG. 7. As in the case of the differential pressure sensor 36, the barometric pressure sensor 40 includes a bellows arrangement and a strain gauge, the latter forming part of a bridge circuit whose output is sensed by a differential amplifier to produce the desired signal. A correction factor may be applied by the microprocessor system 148 if necessary. A suitable barometric pressure sensor 40 is available from the MicroSwitch Division of Honeywell under part number 136PC15A3.

Figure 8:
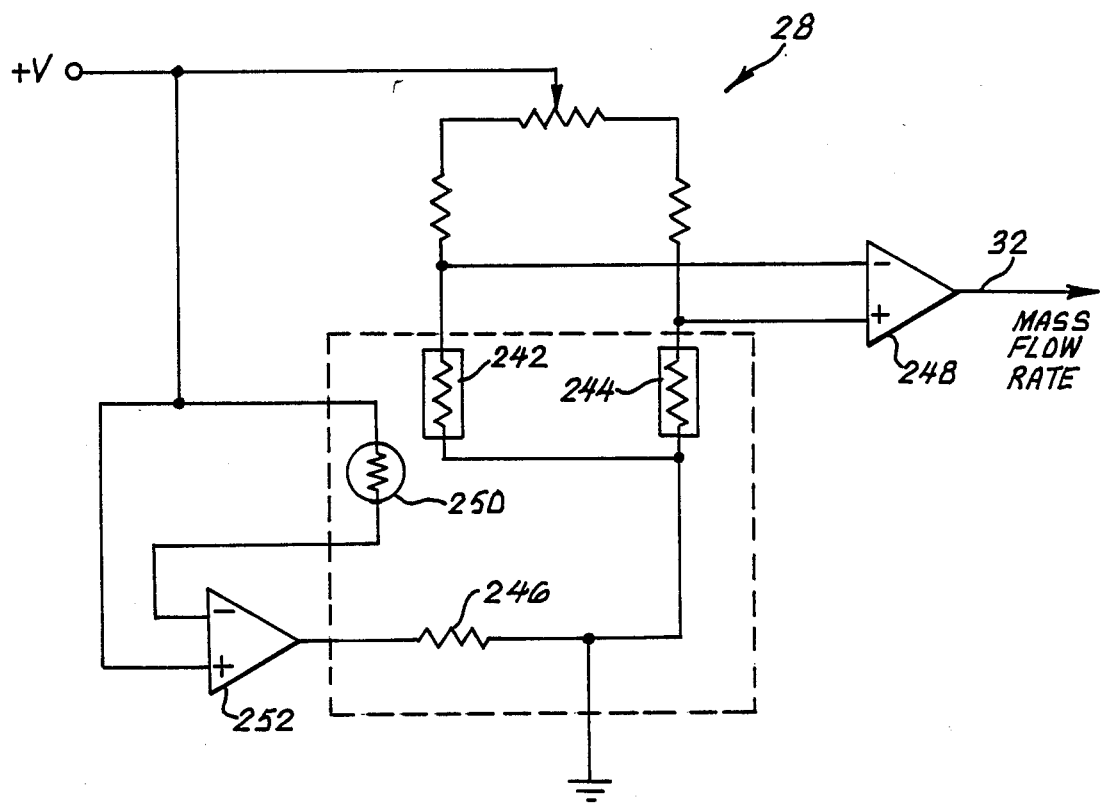
FIG. 8 is a schematic diagram of the circuit used for the flow meter of FIG. 1.

FIG. 8 is a schematic diagram of the electrical circuit used to produce the mass flow rate output 32 of FIG. 1. The mass flow meter 28 is preferably a microbridge mass air flow sensor of the type manufactured by the MicroSwitch Division of Honeywell under part number X88519-AW. This device operates by using heat transfer to determine air flow rate and direction. To this end, the flow meter 28 employs dual resistive elements 242 and 244 flanking a central resistive heating element 246 and forming part of a thin-film thermally isolated bridge circuit. Power is applied to the heating element 246 to raise the temperature of the bridge structure above ambient. Air flowing across the bridge causes a change in temperature, proportional to air flow, which is detected differentially by the resistive elements 242 and 244. The resulting bridge imbalance produces a bridge output voltage that is applied to the inputs of a differential amplifier 248. The output of the differential amplifier 248 is an analog signal whose magnitude and polarity represent the air passing through the flow meter 28.

The flow meter circuit of FIG. 8 is designed to keep the temperature of the heating element 246 at a constant differential above ambient air temperature under varying conditions of temperature and air flow. To accomplish this, the ambient temperature is sensed by a resistive element 250 which is connected to the inputs of a differential amplifier 252. The output of the differential amplifier 252 controls the current to the heating element 246 in such a way that its temperature always exceeds the ambient temperature by a predetermined amount. In this way, the effects of changes in ambient air temperature are eliminated. This mode of operation also reduces the effects of changes in humidity and gas composition, factors which would otherwise alter the thermal conductance of the air and hence change the operating characteristics of the flow meter.

The mass flow rate output 32 generated by the circuit of FIG. 8 is digitized by circuitry to be described hereinafter in connection with FIG. 10, and is used as an input to the microprocessor system 148 of FIG. 4. Accurate flow rate measurements allow the microprocessor to determine precisely how much air has passed through the particulate filter 22 during a given period of time, thereby making it possible to obtain precise radon decay product measurements. Measurement of the actual air flow rate through the system also enables accurate control of the speed of the motor that is used to drive the diaphragm pump 68 of FIG. 1.

Figure 9:
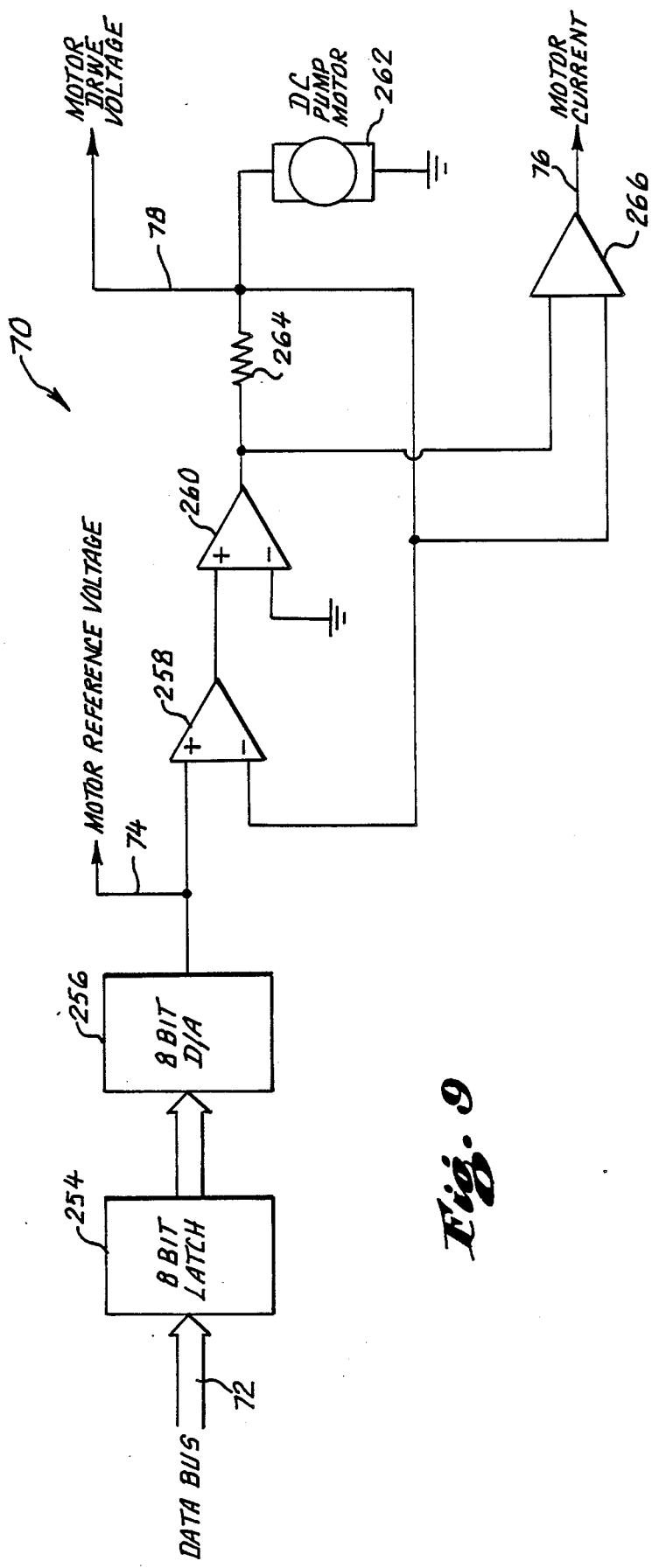
FIG. 9 is a schematic diagram of the pump control circuit shown generally in FIG. 4.

The pump control circuit 70 of FIGS. 1 and 4 is shown in detail in FIG. 9. An 8-bit latch 254 receives a digital control word, whose value is proportional to the desired motor speed, from the microprocessor system 148 via the bidirectional data bus 72. The digital output of the 8-bit latch 254 is converted to an analog signal by an 8-bit digital-to-analog converter 256. The output of the digital-to-analog converter 256 constitutes the motor reference voltage 74 of FIGS. 1 and 4, and is applied to the positive input of an operational amplifier 258. The output of the operational amplifier 258 drives a Darlington power driver 260. The output of the power driver 260 operates the DC pump motor 262 through a 10-ohm current sensing resistor 264. Since the power driver 260 and the sensing resistor 264 contribute translation errors and a voltage drop, the voltage to the motor winding is fed back to the negative input of the operational amplifier 258. Any losses in the power driver 260 and the sensing resistor 264 will result in a negative voltage difference at the negative input of the operational amplifier 258, causing the operational amplifier 258 to increase its output. As a result, the voltage applied to the terminals of the DC pump motor 262 will be within a few millivolts of the programmed voltage, and will remain so independent of the component values of the power driver 260 and sensing resistor 264 and changes in the loading of the pump 68. In order to monitor the pump performance, the motor drive or winding voltage is taken as an output on line 78 and is used as an input to the sensor input module 154 of FIG. 4. In addition, the voltage across the current sensing resistor 264 is applied as an input to an operational amplifier 266, and the amplifier provides a voltage output on line 76 which is proportional to the motor current. The output 76 is applied as an additional input to the sensor input module 154 of FIG. 4.

Figure 10:
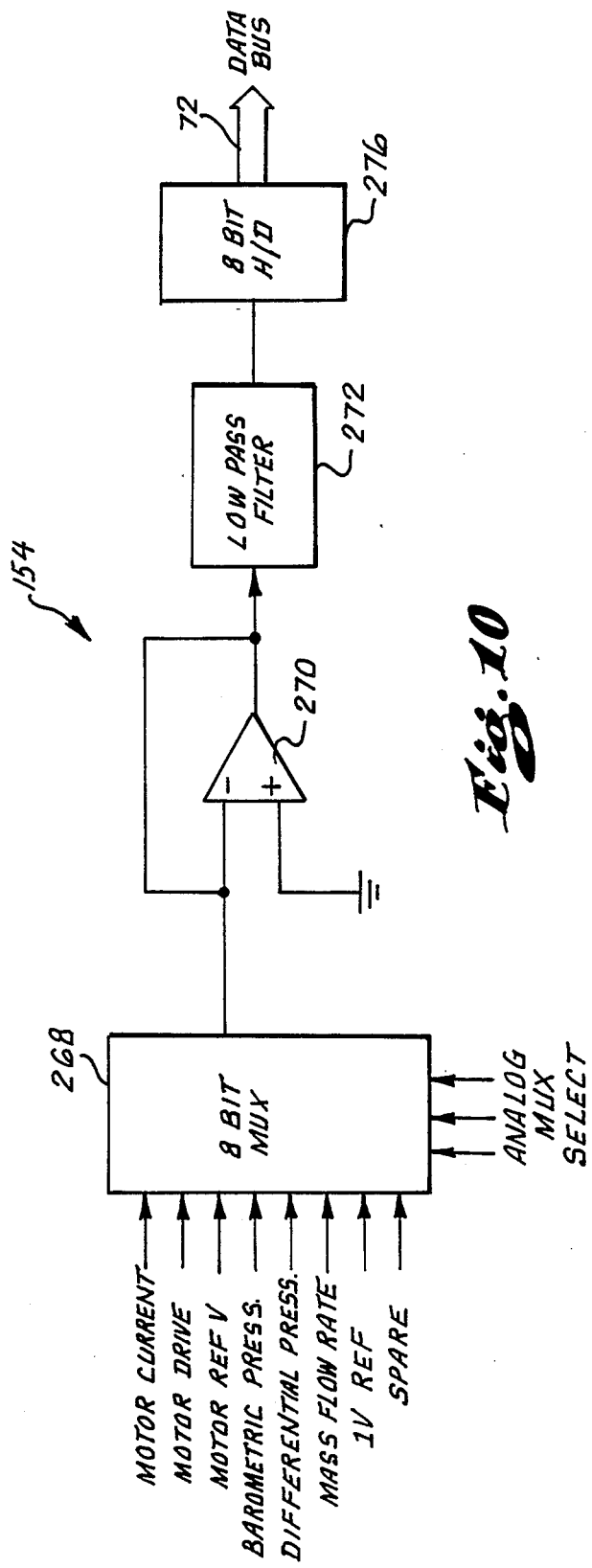
FIG. 10 is a schematic diagram of the sensor input module shown generally in FIG. 4.

FIG. 10 illustrates in detail the electrical circuitry of the sensor input module 154. An 8-bit multiplexer 268 receives as analog inputs the motor current 76, motor drive voltage 78, motor reference voltage 74, barometric pressure 42, differential pressure 38, mass flow rate 32, and a 1-volt reference used for calibration and testing purposes. The remaining input is left as a spare. The input of the multiplexer 268 is selected by an analog multiplex select signal which is generated by the 8-bit mode latch 234 of FIG. 6. The output of the multiplexer 268 is connected to the negative input of a unity-gain amplifier circuit 270. The output of the amplifier circuit 270 is connected through a low-pass filter 272 to an 8-bit analog-to-digital converter 274, which converts the analog signal to a digital value. The digitized output is transmitted to the microprocessor system 148 via data bus 72. Thus, depending on the state of the analog multiplex select bits, the microprocessor will receive a digital input corresponding to one of the seven analog inputs to the 8-bit multiplexer 268.

Figure 11:
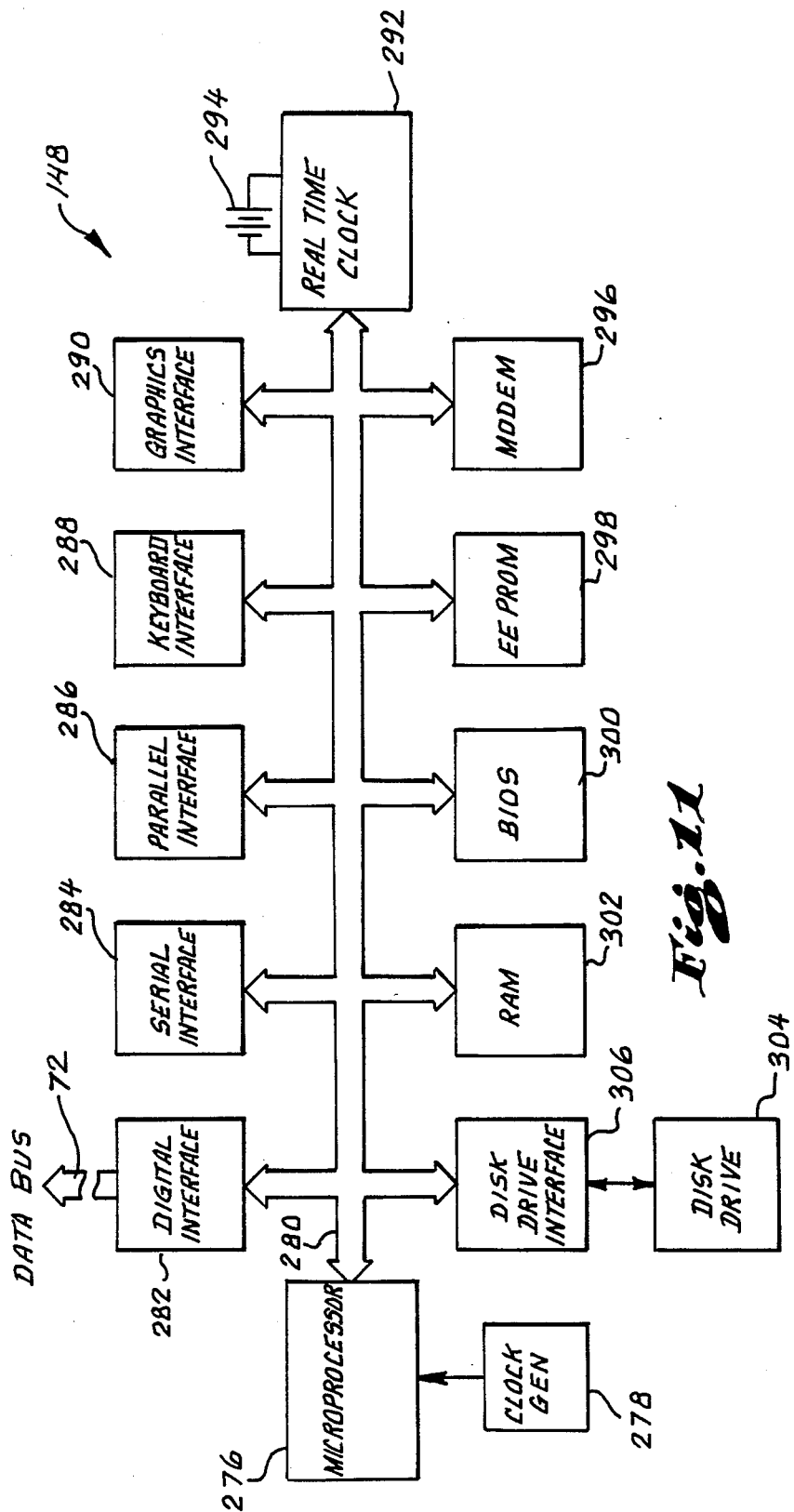
FIG. 11 is a schematic diagram of the microprocessor system shown generally in FIG. 4.

FIG. 11 illustrates the components of the microprocessor system 148. The microprocessor 276 is driven by a clock generator 278 and is connected to each of the remaining components by means of a local bidirectional data bus 280. A digital interface 282 connects the local data bus 280 to the main data bus 72 of the radon detection unit to allow bidirectional data transfer. A serial RS-232 interface 284 is provided for external equipment control and communications. This provides a means by which an external computer can access test data or modify test parameters at the test site. A parallel interface 286 is provided to allow a user to utilize the internal computer capability of the radon detection system to generate reports or other types of data via a printer. A keyboard interface 288 is provided to allow for stand-alone operation of the radon detection unit. A graphics interface 290 allows a video monitor to be added to the system to display measurement data and other information. A real time clock 292 provides the microprocessor system with continuous date and time information and includes a battery back-up 294 for use during power interruptions. A modem 296 may be connected to the local data bus 280 to allow measurement data to be transmitted by a telephone line to a remote location if desired. An EEPROM (Electrically Erasable Programmable Read Only Memory) 298 is included to provide a means of non-volatile data storage for equipment history and calibration information. A ROM BIOS 300 is included to provide basic input/output operations and to begin the power-up, self-test and booting procedures. A random access memory (RAM) 302 of 256K bytes provides working memory for the system. A disk drive unit 304 is connected to the data bus 280 by means of a disk drive interface 306. The disk drive unit 304 accommodates standard 3.5-inch, 720K-byte floppy magnetic diskettes on which the measured radon gas and decay product concentrations, environmental parameters, and tamper-indicating conditions are recorded and preserved for later analysis. Alternatively, this information may be stored in AM or in some other type of memory device, and may be retrieved either by removing the memory device from the radon detection unit or by transferring the recorded data to a portable computer at the test site.

Figure 13A:
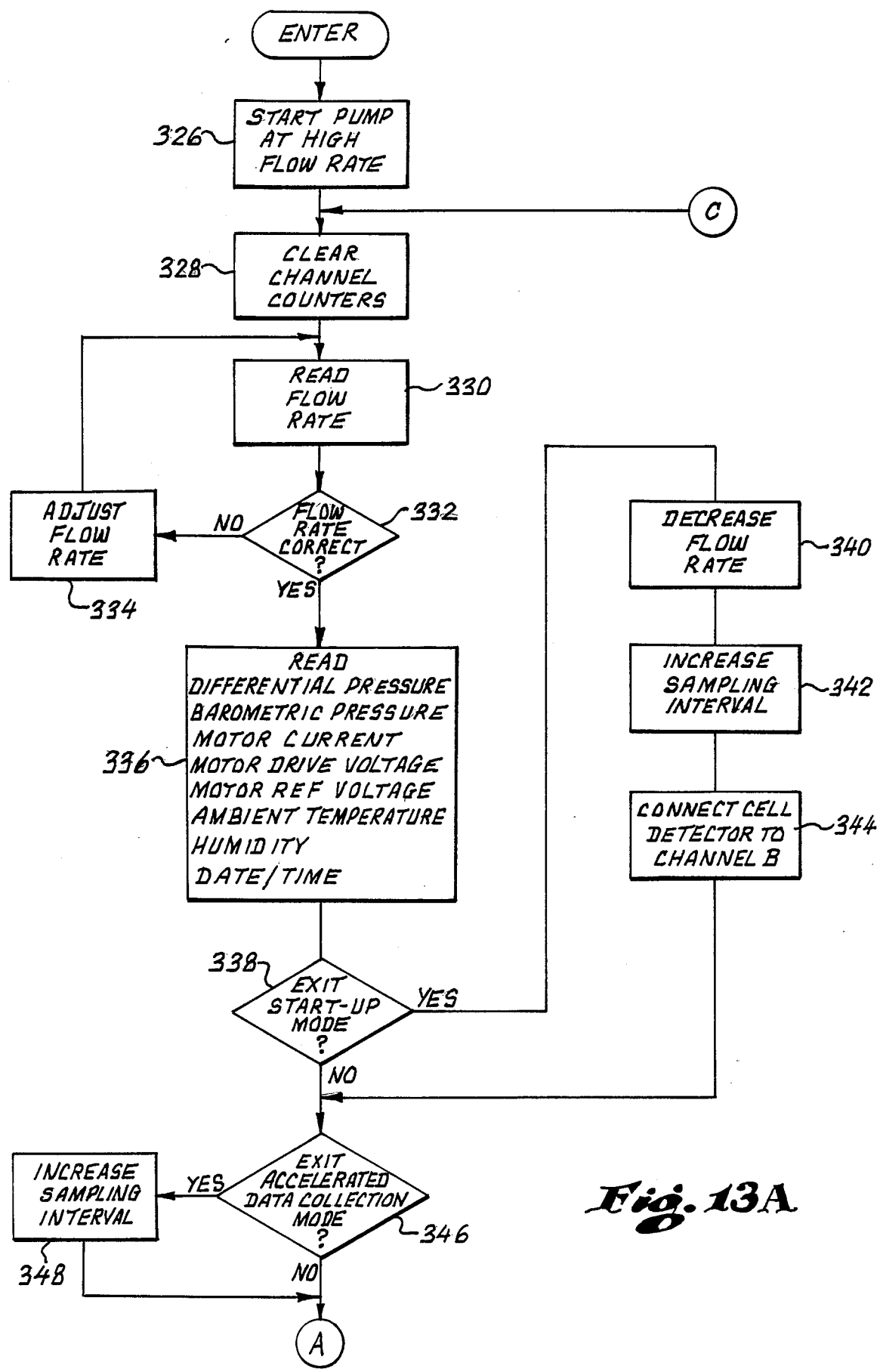
Figure 13B:
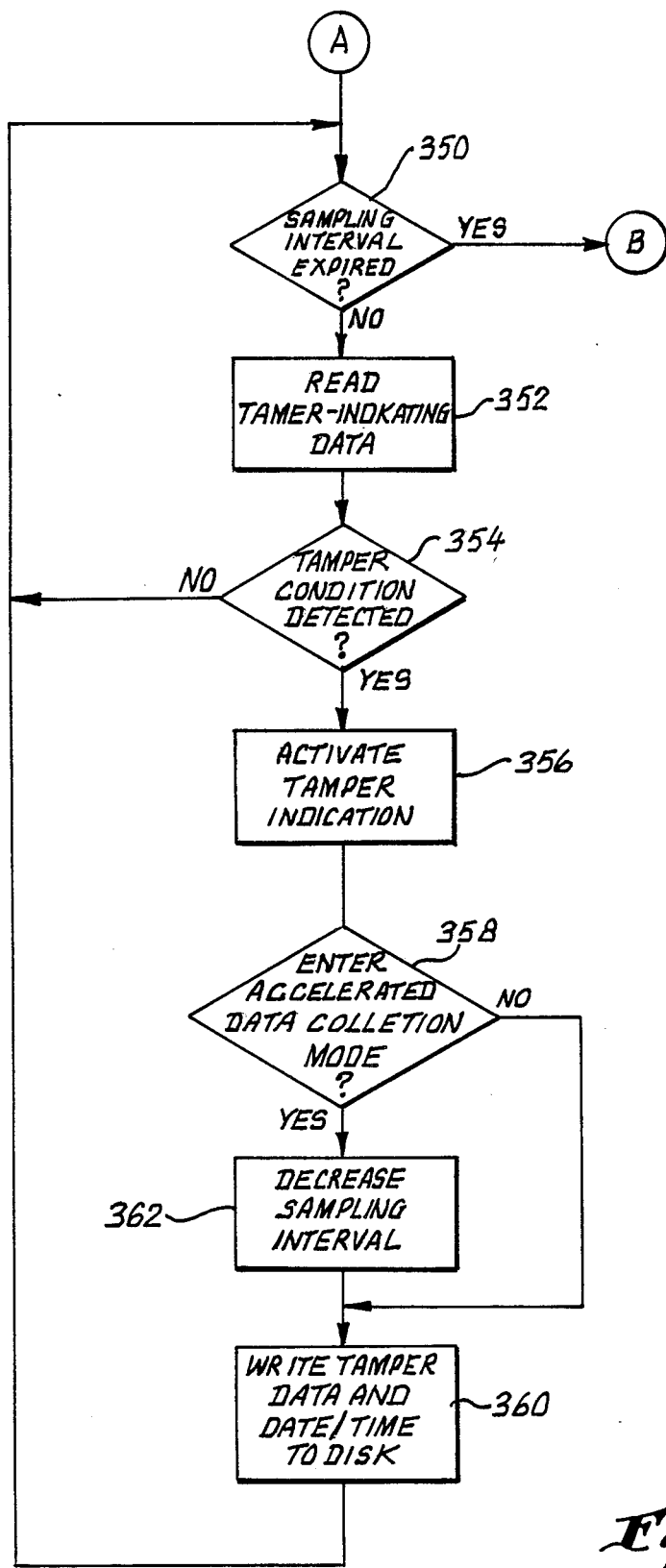
Figure 13C:
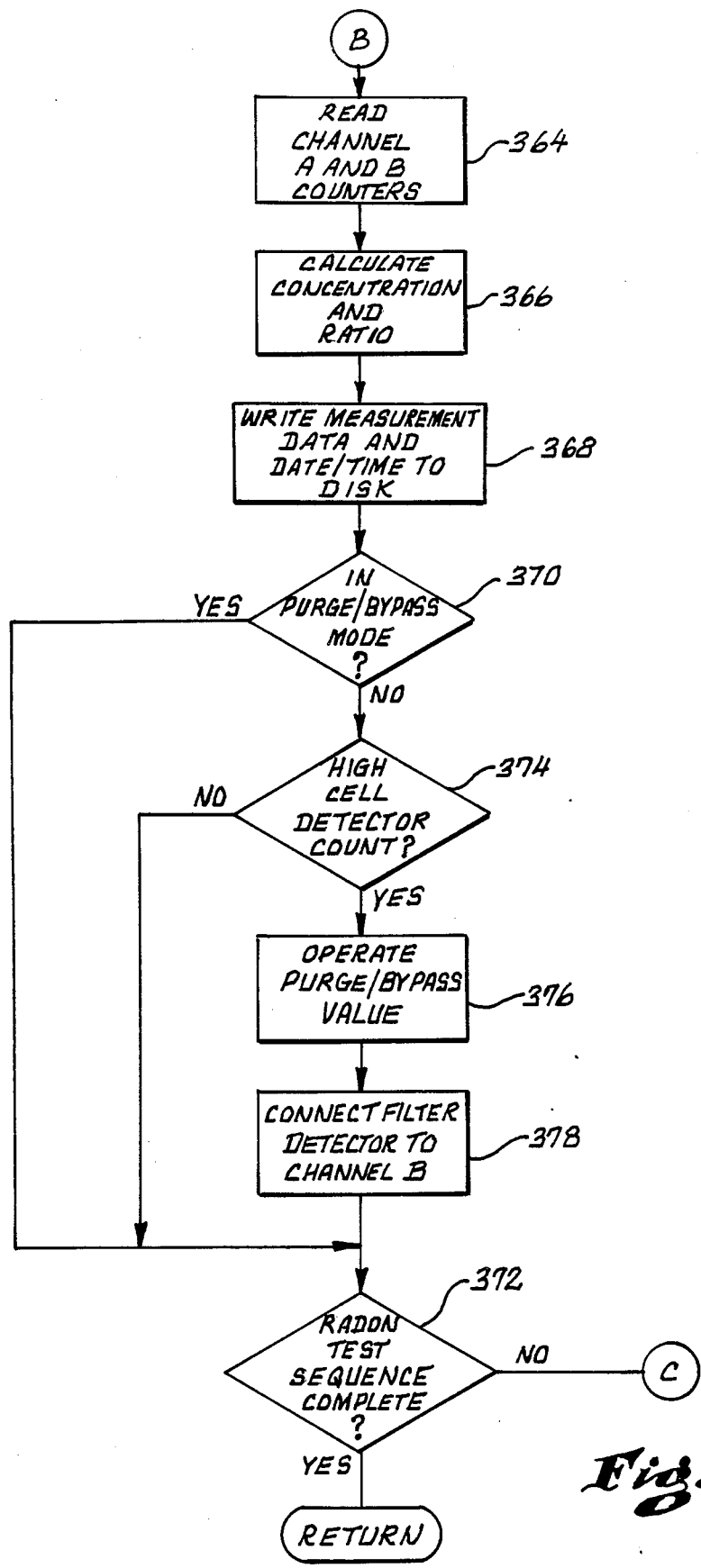

The flow charts set forth in FIGS. 12 and 13 provide a functional description of the manner in which the microprocessor 276 of FIG. 11 is programmed in order to carry out the operations that have so far been described. Implementation of the flowcharts of FIGS. 12 and 13 in terms of specific programming steps will vary somewhat according to the particular microprocessor hardware chosen.

Referring first to FIG. 12, a radon test sequence is commenced by enabling the microprocessor 276 with a power-up signal, represented by block 308 of FIG. 12. The power-up signal is generated as a result of electrical power being supplied to the radon detection system. The microprocessor responds to the power-up signal by generating commands to initialize the computer hardware elements of the detection system, as indicated by block 310. In the preferred embodiment, the specific computer hardware elements requiring initialization include the devices connected to the local data bus circuitry of FIG. 11, such as the monitor, modem, and disk drive. The next operation executed by the microprocessor, as represented by block 312, is to load the present date and time into the system to indicate the beginning of a radon test sequence. The microprocessor then proceeds to block 314, where the system control software is loaded from the disk drive 304 of FIG. 11 into the RAM 302 and initiated. This software controls all of the subsequent activities of the system.

As indicated by block 316, each of the test hardware elements of the system is initialized to its nominal state. The initializing of the test hardware in accordance with block 316 sets initial operating parameters for the circuits and modules shown in FIG. 4. This includes the setting of the initial position of the valve 44 and relay 208. The initial valve position is such that the air flow passes through the scintillation cell 48 as opposed to the charcoal filter 60 or bypass line 64. The contacts 206 of the relay 208 are moved to the phantom position of FIG. 5 to isolate the output of the cell detector 52 and allow radon A and radon C' concentrations to be measured by applying the output of the filter detector 24 to the amplifier channels A and B.

Once the test hardware is initialized, the microprocessor initiates certain self-test procedures as indicated by block 318. During the self-test procedures, the microprocessor tests the amplifier and counter circuits, analog-to-digital and digital-to-analog converters, pump control circuit, flow meter, system reference voltage and sensors. The self-test procedures are followed by a background count test as indicated by block 320. The background count test determines the level of radon decay products initially present on particulate filter 22 as well as the levels of radon gas and decay products located in the scintillation cell cavity 134 due to prior use of the system. Relatively low background values are subtracted from the actual measured values generated later during testing. If, however, either of the background counts exceeds a predetermined threshold, the test will not proceed until manual corrective action has been taken (i.e., changing the filter element 22 or purging the cell cavity 134).

The results of all of the previously completed tests are reported to the microprocessor as indicated by block 322 of FIG. 12. In the preferred embodiment of the present invention, the on-site operator utilizes a portable computer to examine these results and makes a determination as to whether the present state of the system will allow an accurate measurement to be taken. If so, the on-site operator uses the portable computer to load a job number into the microprocessor 276, and also enters a dwelling profile into the memory of the portable computer for later use. The dwelling profile includes information concerning the structure of the house, the type heating system used, the presence or absence of a sump, and the presence of any outdoor ground cover that may affect radon level measurements.

Having completed both the self-testing procedures of block 318 and the background count test of block 320, the microprocessor proceeds to block 324 of FIG. 12 and commences the radon test sequence. The flowchart of FIG. 13 is a functional description of the manner in which the microprocessing system is programmed in order to carry out the radon test sequence of block 324.

The microprocessor 276 begins the radon test sequence of block 324 by starting the pump 68 at the high flow rate utilized during the start-up mode, as suggested by block 326. This flow rate, which may be in the range of about 500–750 milliliters per minute, provides increased sensitivity during the start-up mode. During this mode, a baseline value is obtained for total radon decay product concentration, and a value is also obtained for the ratio of the radon A and radon C' concentrations. During subsequent operation of the radon detection system, the baseline radon decay product concentration may be used to project expected decay product concentrations and to detect tampering when actual values depart from these projections. The ratio of the radon A and radon C' concentrations provides an indication of whether the measurement area has recently been ventilated, a condition which is likely to affect subsequent radon level measurements. Since it is usually required that the structure be kept closed and unventilated for a predetermined period of time prior to the test, this ratio will effectively detect an attempt to tamper with the measurement conditions by ventilating the structure prior to the arrival of the operator at the test site.

From block 326, the microprocessor proceeds to block 328 and clears the channel counters 220 and 228 of FIG. 6. The next operation performed by the microprocessor, as indicated by block 330, is to read the output 32 of the flow meter 28 to determine the air flow rate through the system. Proceeding now to blocks 332 and 334, the microprocessor repeatedly tests for a measured flow rate within a predetermined range. The flow rate is adjusted, as suggested by block 334, until the measured flow rate is within the allowed variation from the desired flow rate. When a correct flow rate has been read by block 330 and verified by block 332, the microprocessor proceeds to block 336 and reads the appropriate sensors to obtain the measured values of the differential pressure, barometric pressure, motor current, motor drive voltage, motor reference voltage, ambient temperature, humidity and present date and time.

The next function carried out by the microprocessor, as indicated by block 338, is to determine whether the predetermined time interval for the start-up mode has expired. If it has, the microprocessor exits the start-up mode and modifies several operating parameters. The first modification, as shown by block 340, is to decrease the air flow rate through the system to the nominal value of about 250 milliliters per minute. The second modification, as indicated by block 342, involves increasing the data sampling interval so that fewer data samples are recorded per unit time during normal operation as compared to the start-up mode. The final modification, as shown by block 344, is to change the position of the contacts 206 of the relay 208 in FIG. 5 such that the cell detector 52 is connected to the channel B amplifier circuit.

After having operated the relay 208, or if it is determined in decision block 338 that the start-up mode is not complete or that the system has previously exited the start-up mode, the microprocessor proceeds to a further decision block 346 to determine whether the system should exit the accelerated data collection mode if it is currently in this mode. If so, the sampling interval is increased, as suggested by block 348, to conform with normal operating conditions. If it is determined that the system is not operating in the accelerated data collection mode or should not yet exit this mode, the microprocessor proceeds to decision block 350.

In the decision block 350, the microprocessor determines whether the sampling interval has expired. The sampling interval controls the frequency at which the radon level measurements and environmental parameters are recorded. If the microprocessor determines that the sampling interval has not yet expired, the system enters a subloop (blocks 350-362) and executes a tamper monitoring routine for the remainder of the sampling interval. In block 352, the microprocessor reads the tamper-indicating data, including the outputs of the ambient temperature sensor 166, ambient light sensor 168, proximity sensor 170, motion, shock and tilt sensor 172, humidity sensor 174, barometric pressure sensor 40, and differential pressure sensor 36, as well as the calculated concentration ratios and the power interruption status. The microprocessor then proceeds to decision block 354 and determines whether a tamper-indicating condition is present. If no tamper-indicating conditions are present, the microprocessor returns to decision block 350 and once again determines whether the sampling interval has expired. If the sampling interval has still not expired, the microprocessor re-executes the tamper subloop.

Referring again to decision block 354, the detection of a tamper-indicating condition causes the microprocessor to activate a panel-mounted tamper LED by causing the external control circuit of FIG. 4 to produce an output on line 162. The tamper LED may be accompanied or replaced by an audible indication if desired. The microprocessor then proceeds to decision block 358 and determines whether the specific tamper condition detected is one of the designated tamper conditions which cause the system to enter an accelerated data collection mode. Typically, the designated tamper conditions would include an output from the ambient light sensor 168 or from the motion, shock and tilt sensor 172, or an abrupt change in ambient temperature, differential pressure, or radon gas and decay product levels. If the detected tamper condition is not one of the designated conditions, the tamper data (i.e., the information read in block 352) and the present date and time are written to the disk as indicated by block 360. The microprocessor then proceeds once again to decision block 350 and determines whether the sampling interval has expired. If the sampling interval has still not expired, the microprocessor once again re-executes the tamper subloop. Referring again to block 358, if the detected tamper condition is one of the designated tamper conditions, the microprocessor proceeds to block 362 and decreases the sampling interval in order to enter the accelerated data collection mode. This modification allows a more frequent reading and recording of the measured data read in block 336 and the radon level measurements to be read subsequently. The microprocessor then proceeds to block 360 and writes the tamper data from block 352 as well as the present date and time to the disk. The microprocessor next proceeds to the decision block 350 to determine whether the sampling interval has expired.

Upon expiration of each sampling interval, the microprocessor exits the tamper subloop (blocks 350-362) and proceeds to block 364 where the values of the counters 220 and 228 of channels A and B respectively, are read. The channel A count is representative of the radon decay product concentration (consisting principally of radon A and radon C') measured by the filter detector 24 of FIG. 1. The channel B count is representative of the radon C' concentration during the start-up mode previously discussed or during the purge/bypass mode to be discussed shortly. At other times, the channel B count is representative of the radon gas measurement from scintillation cell 48. Following the reading of the channel A and B counters, the microprocessor proceeds to block 366 and calculates the concentration of radon gas and the concentration of radon decay products, or (in the start-up or purge-bypass mode) the concentrations of radon A and radon C'. The decay product concentrations are calculated using the measured flow rate of air through the radon detection unit and the known detector counting efficiency. Also calculated in block 366 is the ratio of the gas and decay product concentrations, or of the radon A and radon C' concentrations. The data from blocks 336, 364 and 366, as well as the present date and time, are written to the disk as indicated in block 368. The next operation executed by the microprocessor is to determine whether the system is in the purge/bypass mode, as indicated by block 370. If the system is in the purge/bypass mode, the microprocessor proceeds to decision block 372 and determines whether the radon test sequence at the present site is complete. If the system is not in the purge/bypass mode, the microprocessor proceeds to decision block 374 and determines whether the cell detector count is in excess of a predetermined threshold value. If not, or if the cell detector 52 is electrically isolated due to the position of relay 208, the microprocessor proceeds to decision block 372 to determine whether the radon test sequence at the present site is complete. Referring again to decision block 374, if the cell detector count is determined to be above the threshold, the system is switched into the purge/bypass mode. This mode change involves two modifications. The first modification, as indicated by block 376, is to operate the 3-way distributing valve 44 to first purge the scintillation cell 48 and then cause the air flow to bypass the cell 48 altogether. The second modification, as indicated by block 378, is to change the position of relay 208 of FIG. 5 to electrically connect the filter detector 24 to channel B, thus electrically isolating the cell detector 52. Following the aforementioned changes, the system is in the purge/bypass mode and the microprocessor again proceeds to decision block 372 to determine whether the radon test sequence at the present site is complete. Referring to decision block 372, if the test sequence is not complete, the microprocessor proceeds to block 328 and begins the next sampling interval. When a timer or manual input indicates that the test sequence is complete, the microprocessor proceeds to block 380 of FIG. 12. At this point, the radon detection unit may be retrieved from the test site and the measurement data stored on the diskette or in on-board random access memory may be transferred to a portable computer and stored along with the dwelling profile mentioned previously. If desired, the data can then be transmitted to a central location by means of a telephone modem for immediate analysis. The portable computer can also be used to analyze the system status to determine whether valid radon level measurements were obtained. Following the completion of the status report, the microprocessor initiates a power-off procedure as indicated by block 382.

The flow chart set forth in FIG. 14 is a functional description of the manner in which a projection of the annual average radon level for the site tested may be obtained. These steps may be carried out by a computer at a central location, by a portable computer transported to the test site, or by additional programming within the radon detection unit itself. As indicated by block 384 of FIG. 14, the microprocessor begins by reading the measurement data written to the disk from blocks 360 and 368 of FIG. 13. The next operation executed by the microprocessor is to validate this measurement data as indicated by block 386. The validation of the measurement data is carried out by evaluating the recorded values of the various tamper-indicating conditions and determining from these values and from the contemporaneous radon level measurements whether tampering is likely to have occurred during the test sequence. The manner in which this may be accomplished will be explained in more detail below. The validated radon level measurement data is next correlated with the environmental data recorded during the radon test sequence, as indicated by block 388. Following block 388, the microprocessor proceeds to block 390 and uses the correlated data to calculate a projected annual average radon level for the test site. This involves the use of an empirically determined algorithm which takes into account the effects of the measured environmental parameters as well as certain other factors that are specific to the structure under test. This algorithm will be described in more detail shortly. After the average annual radon level has been determined in block 390, the microprocessor proceeds to block 392 and generates a report listing the measured radon gas and decay product concentrations, the contemporaneous values of barometric pressure, temperature and humidity, and the projected average annual radon gas and decay product concentrations.

With reference to block 386, the measurement data is validated by checking for certain combinations or sequences of tamper-indicating condition which are likely to indicate actual tampering. For example, an output from the proximity sensor 170 of FIG. 4 would not in itself indicate tampering, but when followed by an abrupt change in temperature or humidity and by a drop in the measured radon gas concentration, it is likely to indicate that the ventilation to the test area has been increased by opening a door or window. Similarly, a proximity indication followed by an abrupt change in the differential pressure across the particulate filter and by a decrease in the measured level of radon decay products is likely to indicate that the air intake port 18 of the radon detection unit has been covered with a cloth or other covering in order to filter the incoming air. If the radon detection unit has been moved outdoors or to some other location where lower radon levels exist, this is likely to be revealed by a proximity indication followed by an output from the motion, shock and tilt sensor 172 of FIG. 4 and by a rapid decrease in the measured concentration of radon gas. A power interruption may also be detected under these circumstances if the radon detection unit is temporarily disconnected from the power source to allow a power extension cord to be connected. If the radon detection unit is enclosed or covered in some way, this is likely to be indicated by outputs from the proximity sensor 170 and ambient light detector 168, followed by a decrease in the measured concentration of radon decay products. Other combinations or sequences of tamper-indicating conditions involving sensor outputs, environmental parameters, measured radon gas and decay product concentrations, and calculated radon gas and decay product ratios can be identified based on empirical observations. The occurrence of any of these combinations or sequences will be interpreted to mean that tampering is likely to have occurred during the test period, and all data recorded during that test period will be discarded as invalid.

Referring now to block 390 of FIG. 14, the annual or long-term average radon level is projected from the recorded radon level and environmental data through the use of an algorithm which may have the following general form:

$$C = (1/n) \Sigma \, C(\text{meas}) \cdot f\{P(\text{meas}), P(\text{avg}), T(\text{meas}), T(\text{avg}), H(\text{meas}), H(\text{avg}), W(\text{meas}), W(\text{avg}), G, S, B, V\}$$

wherein C is the projected long-term average radon gas or decay product concentration, n is the number of individual measurements which are to be included in the average, C(meas) is the measured radon gas or decay product concentration recorded during the test period, and f is an empirically obtained function which normalizes the measured concentrating by taking into account a number of factors. These factors include the measured barometric pressure P(meas) during each sampling interval, the seasonal average barometric pressure P(avg) for the region, the measured temperature T(meas) during the sampling interval, the seasonal average T(avg) for the region in degree-days, the measured humidity H(meas) during each sampling interval, the seasonal average humidity H(avg) for the region, the average wind speed W(meas) for the test period, determined from a local weather station, the seasonal average wind speed W(avg) for the region, a factor G which depends upon the presence of certain types of ground cover (e.g., snow, ice or residual rainfall) at the test site during the measurement period, a factor S which depends upon the existence of a sump or other likely radon gas entry point in the structure under test, a factor B which depends upon the type of building construction (e.g., basement, crawl space, slab, split level, and so on), a factor V which depends upon the type of heating, ventilation and/or air conditioning system used in the structure (e.g., furnace or heat pump). Each of the factors used in the function f is known or believed to have an effect on measured radon levels within a given structure, although the weight assigned to each factor may be varied depending on empirical data.

Although the present invention has been described with reference to a preferred embodiment, the invention is not limited to the details thereof. For example, although a switching arrangement between the two measurement channels of the radon detection system has been disclosed as a means for obtaining either radon gas and decay products concentrations or the concentrations of two different radio decay products, it should be apparent that three measurement channels may be employed in order to avoid the need for a switching device. In addition, although the foregoing description has assumed that the analysis and reporting of the recorded radon levels, environmental data and tamper-indicating conditions is carried out at a central location after the recorded data is retrieved from the radon detection unit, it is also within the scope of the invention to use the radon detection unit to carry out the analysis and reporting steps so that a report can be generated at the test site. These and other modifications which may occur to those skilled in the art are intended to fall within the spirit and scope of the invention as defined in the appended claims.

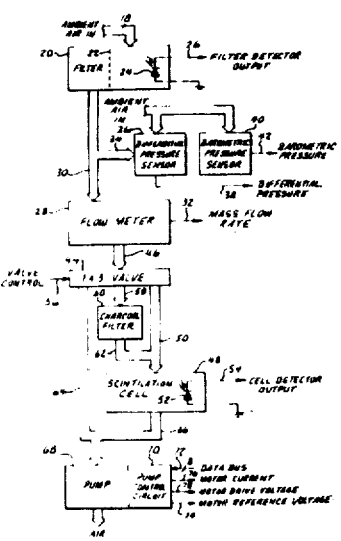

What is claimed is:

1. A radon detection system comprising:
   first means for measuring an airborne radon level, said first means comprising a particulate filter for collecting at least one radon decay product, means for directing ambient air through said filter, a first detector for detecting radon decay product collected by said filter, and a second detector for detecting radon gas in the filtered air exiting form said filter;
   second means for monitoring at least one additional environmental parameter other than radon level; and
   recording means connected to said first and second means for recording on a common recording medium the measured radon level and the contemporanious value of said additional environmental parameter.

2. The radon detection system of claim 1, wherein said additional environmental parameter is selected from the group consisting of barometric pressure, temperature and humidity.

3. The radon detection system of claim 1, wherein said common recording medium comprises a magnetic machine-readable recording medium.

4. The radon detection system of claim 1, wherein aid first detector comprises a solid state alpha detector.

5. The radon detection system of claim 1, wherein said second detector comprises:
   a scintillation cavity; and
   a photodetector associated with said scintillation cavity.

6. A radon detection system comprising:
   first means for measuring an airborne radon level;
   second means for monitoring at least one additional parameter indicative of possible tampering; and
   recording means connected to said first and second means for recording on a common recording medium the measured radon level and the contemporaneous value of said additional parameter.

7. The radon detection system of claim 6 wherein said additional parameter is selected from the group consisting of barometric pressure, temperature, humidity, motion, shock, tilt, proximity, ambient light, and power interruption.

8. The radon detection system of claim 6, wherein said first means is effective to separately measure the level of airborne radon gas and the level of at least one airborne radon decay product, and wherein said additional parameter comprises the ratio between the measured level of radon gas and the measured level of said radon decay product.

9. The radon detection system of claim 6, wherein said first means comprises a particulate filter, means for directing ambient air through said filter, and a detector for detecting at least one radon decay product collected by said filter, and wherein said additional parameter comprises the differential air pressure across said filter.

10. The radon detection system of claim 6, further comprising indicating means connected to said second means for providing a tampering alert in the event of possible tampering.

11. The radon detection system of claim 6, wherein said first means is effective to measure the levels of at least two different airborne radon decay products, and wherein said additional parameter comprises the ratio between the measured levels of said radon decay products.

12. A radon detection method comprising the steps of:
   measuring an airborne radon level;
   monitoring at least one additional parameter indicative of possible tampering; and
   recording on a common recording medium the measured radon level and the contemporaneous value of said additional parameter.

13. The method of claim 12, wherein said additional parameter is selected from the group consisting of barometric pressure, temperature, humidity, motion, shock, tilt, proximity, ambient light, and power interruption.

14. The method of claim 12 wherein the step of measuring an airborne radon level comprises separately measuring the level of airborne radon gas and the level of at least one airborne radon decay product, and wherein said additional parameter comprises the ratio between the measured level of radon gas and the measured level of said radon decay product.

15. The method of claim 12, wherein the step of measuring an airborne radon level comprises the steps of causing ambient air to flow through a particulate filter in order to remove and collect at least one radon decay product from the air flow and measuring the radon decay product collected by said filter, and wherein said additional parameter comprises the differential air pressure across said filter.

16. The method of claim 12, wherein the step of measuring an airborne radon level comprises separately measuring the levels of at least two different airborne radon decay products, and wherein said additional parameter comprises the ratio between the measured levels of said radon decay products.

17. The method of claim 12, further comprising the step of producing a tampering alert in response to an abnormal value of said additional parameter that may indicate tampering.

18. A radon detection system comprising:
   first means for measuring an airborne radon level;
   second means for measuring a plurality of additional parameters indicative of possible tampering;
   recording means for recording the measured radon level and the contemporaneous values of said additional parameters; and
   control means connected to said first and second means and to said recording means for causing the measured radon level and the contemporaneous values of said additional parameters to be recorded at predetermined intervals, said control means being responsive to an abnormal value of at least one of said additional parameters to reduce the length of said intervals in order to increase the recording rate when possible tampering in indicated.

19. The radon detection system of claim 18, wherein said additional parameters are selected from the group consisting of barometric pressure, temperature, humidity, motion, shock, tilt, proximity, ambient light, and power interruption.

20. The radon detection system of claim 18, wherein said first means is effective to separately measure the level of airborne radon gas and the level of at least one airborne radon decay product, and wherein one of said additional parameters comprises the ratio between the measured level of radon gas and the measured level of said radon decay product.

21. The radon detection system of claim 18, wherein said first means comprises a particulate filter, means for directing ambient air through said filter, and a detector for detecting at least one radon decay product collected by said filter, and wherein one of said additional parameters comprises the differential air pressure across said filter.

22. The radon detection system of claim 18, wherein said first means is effective to separately measure the levels of at least two airborne radon decay products, and wherein at least one of said additional parameters comprises the ratio between the measured levels of said radon decay products.

23. The radon detection system of claim 18, further comprising indicating means connected to said control means for producing a tamper alert in response to an abnormal value of said additional parameter.

24. A radon detection method comprising the steps of:
  measuring an airborne radon level;
  monitoring a plurality of additional parameters indicative of possible tampering;
  in the absence of an indication of possible tampering, recording the measured radon level and the contemporaneous values of said additional parameters at a first recording rate;
  in response to possible tampering indicated by an abnormal value of at least one of said additional parameters, recording the measured radon level and the contemporaneous values of said additional parameters at a second recording rate greater than said first recording rate.

25. The method of claim 24, wherein said additional parameters are selected from the group consisting of barometric pressure, temperature, humidity, motion, shock, tilt, proximity, ambient light, and power interruption.

26. The method of claim 24, wherein the step of measuring an airborne radon level comprises separately measuring the level of airborne radon gas and the level of at least one airborne radon decay product, and wherein at least one of said additional parameters comprises the ratio between the measured level of radon gas and the measured level of said radon decay product.

27. The method of claim 24, wherein the step of measuring an airborne radon level comprises the steps of causing ambient air to flow through a particulate filter in order to remove and collect at least one radon decay product from the air flow and measuring the radon decay product collected by said filter, and wherein one of said additional parameters comprises the differential air pressure across said filter.

28. The method of claim 24, wherein the step of measuring an airborne radon level comprises separately measuring the level of at least two different airborne radon decay products, and wherein at least one of said additional parameters comprises the ratio between the measured levels of said radon decay products.

29. The method of claim 24, further comprising the step of producing a tamper alert in response to possible tampering indicated by the value of said additional parameter.

30. A radon detection method comprising the steps of:
  measuring an airborne radon level;
  contemporaneously monitoring at least one additional parameter indicative of possible tampering; and
  validating the measured radon level by determining from the contemporaneous value of said additional parameter whether tampering is likely to have occurred.

31. The method of claim 30, wherein a plurality of additional parameters are measured, and wherein the step of validating the measured radon level comprises determining from the contemporaneous values of more than one of said additional parameters whether tampering is likely to have occurred.

32. The method of claim 30, further comprising the step of recording the measured radon level and the contemporaneous value of said additional parameter.

33. The method of claim 30, wherein said additional parameter is selected from the group consisting of barometric pressure, temperature, humidity, motion, shock, tilt, proximity, ambient light, and power interruption.

34. The method of claim 30, wherein the step of measuring an airborne radon level comprises separately measuring the level of airborne radon gas and the level of at least one airborne radon decay product, and wherein said additional parameter comprises the ratio between the measured level of radon gas and the measured level of said radon decay product.

35. The method of claim 30, wherein the step of measuring an airborne radon level comprises the steps of causing ambient air to flow through a particulate filter in order to remove and collect at least one radon decay product from the air flow and measuring the radon decay product collected by said filter, and wherein said additional parameter comprises the differential air pressure across said filter.

36. The method of claim 30, wherein the step of measuring an airborne radon level comprises separately measuring the levels of at least two different airborne radon decay products, and wherein said additional parameter comprises the ratio between the measured levels of said radon decay products.

37. A radon detection system for continuously monitoring airborne levels of radon gas and of at least one airborne radon decay product, comprising:
  an air flow path;
  means for maintaining a continuous flow of air in said air flow path;
  a particulate filter in said air flow path for removing and collecting at least one radon decay product from the air flow;
  a first detector for detecting the radon decay product collected by said particulate filter; and
  a second detector for detecting radon gas in the filtered air flow exiting from said particulate filter.

38. The radon detection system of claim 37, wherein said first detector comprises a solid state alpha detector.

39. The radon detection system of claim 37, wherein said second detector comprises:
  a scintillation cavity having a radiation sensitive interior surface in communication with the air flow for emitting flashes of light in response to the impingement of alpha particles produced by the decay of radon gas; and a detector for detecting the light flashes emitted by said scintillation cavity and converting said flashes into electrical pulses representing an alpha count.

40. The radon detection system of claim 37, further comprising means for recording the outputs of said first and second detectors.

41. The radon detection system of claim 37, further comprising:
a flow meter for measuring the rate of air flow in said air flow path; and
control means responsive to the output of said flow meter for controlling the operation of said continuous flow means in a manner such that desired air flow is maintained in said air flow path.

42. The radon detection system of claim 37, wherein said flow meter comprises a thermal mass flow rate sensor.

43. The radon detection system of claim 37, wherein the outputs of said first and second detectors are connected to respective first and second detector channels, each of said detector channels comprising:
an amplifier circuit for amplifying the detector output; and
a digital filtering circuit for rejecting detector output pulses of less than a predetermined duration.

44. The radon detection system of claim 37, further comprising:
first and second detector channels; and
switching means for selectively connecting the outputs of said first and second detectors to said first and second detector channels, respectively, or for connecting the output of said first detector to said first and second detector channels while isolating the output of said second detector.

45. The radon detection system of claim 37, further comprising bypass means in said air flow path for selectively causing the air flow to bypass the second detector.

46. The radon detection system of claim 45, wherein said bypass means comprises:
an air flow bypass line connected in parallel with the second detector; and
a valve for selectively directing the air flow through the second detector or through the bypass line.

47. The radon detection system of claim 46, further comprising means for controlling said valve in response to the output of at least one of said first and second detectors.

48. The radon detection system of claim 37, further comprising:
a second filter for removing radon gas from the air flow; and
means for selectively connecting said second filter into the air flow path between the particulate filter and the second detector.

49. The radon detection system of claim 48, wherein said second filter comprises a charcoal filter.

50. The radon detection system of claim 48, wherein the portion of the air flow path between the particulate filter and the second detector includes first and second branches, said first branch including the second filter and said second branch bypassing the second filter, and wherein said means for selectively connecting the second filter into the air flow path comprises a valve for selectively directing the air flow through the first branch or through the second branch.

51. The radon detection system of claim 50, further comprising means for controlling said valve in response to the output of at least one of said first and second detectors.

52. The radon detection system of claim 37, wherein the portion of the air flow path downstream of the particulate filter relative to the air flow direction includes first, second and third branches;
said first branch including the second detector and a second filter connected in series with the second detector located upstream of the second filter relative to the air flow direction, said second filter being effective to remove radon gas from the air flow;
said second branch including the second detector and bypassing the second filter; and
said third branch bypassing the second detector and the second filter;
and further comprising a valve for selectively directing the air flow through the first, second or third branch.

53. The radon detection system of claim 52, wherein said second filter comprises a charcoal filter.

54. The radon detection system of claim 52, further comprising means for controlling said valve in response to the output of at least one of said first and second detectors.

55. A radon detection method comprising the steps of:
causing ambient air to flow through a particulate filter in order to remove and collect at least one radon decay product from the air flow;
detecting the radon decay product collected by the filter;
separately detecting radon gas in the filtered air exiting from said filter.

56. The method of claim 55, further comprising the step of recording the detected levels of radon decay product and radon gas.

57. The method of claim 55, further comprising the steps of:
measuring the air flow through said filter; and
controlling the air flow in response to said measurement in order to maintain a substantially constant air flow through the filter.

58. The method of claim 55, wherein output pulses are produced by the detection of said radon decay product and radon gas, and further comprising the step of filtering said output pulses to reject output pulses of less than a predetermined duration.

59. A radon gas detection system comprising:
an air flow path;
means for maintaining a continuous flow of air in said air flow path;
a detector in said air flow path for detecting radon gas in said air flow; and
bypass means in said air flow path for selectively causing the air flow to bypass said detector, said bypass means comprising an air flow bypass line connected in parallel with said detector and a valve for selectively directing the air flow through the detector or through the bypass line.

60. The radon detection system of claim 59, further comprising means for controlling said valve in response to the output of said detector.

61. A radon detection system comprising;
an air flow path;

means for maintaining a continuous flow of air in said air flow path;

a detector in said air flow path for detecting radon gas in said air flow;

a filter for removing radon gas from the air flow; and means for selectively connecting said filter into the air flow path at a point upstream of said detector relative to the air flow direction;

wherein at least a portion of the air flow path upstream of said detector relative to the air flow direction includes first and second branches, said first branch including the filter and said second branch bypassing the filter, and wherein said means for selectively connecting the filter into the air flow comprises a valve for selectively directing the air flow through the first branch or through the second branch.

62. The radon detection system of claim 61, wherein said filter comprises a charcoal filter.

63. The radon detection system of claim 61, wherein said detector comprises a scintillation cell.

64. The radon detection system of claim 61, further comprising means for controlling said valve in response to the output of the detector.

65. A radon detection system comprising:
an air flow path;
means for maintaining a continuous flow of air in said air flow path;
a detector for detecting radon gas in said air flow;
a filter for removing radon gas from said air flow; and
a valve in said air flow path for selectively directing the air flow into a first branch, a second branch, or a third branch, said first branch including said detector and said filter connected in series with the filter located upstream of the detector relative to the air flow direction, said second branch including said detector and bypassing said filter, and said third branch bypassing said detector and said filter.

66. The radon detection system of claim 65, wherein said detector comprises a scintillation cell.

67. The radon detection system of claim 65, wherein said filter comprises a charcoal filter.

68. The radon detection system of claim 65, further comprising means for controlling said valve in response to the output of said detector.

69. A method for operating a radon detection system comprising an air flow path, means for maintaining a continuous flow of air in said air flow path, and a detector in said air flow path for detecting radon gas in said air flow, said method comprising the steps of:
during a first time interval, directing the air flow to said detector without intermediate filtering to remove radon gas; and
during a second time interval, filtering the air flow to remove radon gas before the air reaches said detector.

70. The method of claim 69, further comprising the step of causing the air flow to bypass said detector during a third time interval.

71. A method for operating a radon detection system comprising an air flow path, means for maintaining a continuous flow of air in said air flow path, and a detector in said air flow path for detecting radon gas in said air flow, said method comprising the steps of:
during a first time interval, directing the air flow to said detector; and
during a second time interval, causing the air flow to bypass said detector.

72. The method of claim 71, further comprising the step of filtering the air flow during a third time interval to remove radon gas before the air reaches said detector.

73. A method for operating a radon detection system comprising a particulate filter, means for causing air to flow through said particulate filter at a predetermined flow rate, and a detector for detecting at least one radon decay product collected by said filter, said method comprising the steps of:
during a first time interval, causing the air to flow through said particulate filter at a first flow rate; and
during a second time interval, causing the air to flow through said particulate filter at a second flow rate;
said first flow rate being greater than said second flow rate in order to provide greater detection sensitivity during said first time interval than during said second time interval.

* * * * *

UNITED STATES PATENT AND TRADEMARK OFFICE
CERTIFICATE OF CORRECTION

PATENT NO.   :   4,920,263

DATED        :   Apr. 24, 1990

INVENTOR(S)  :   Keith S. Fimian, et al.

It is certified that error appears in the above-identified patent and that said Letters Patent is hereby corrected as shown below:

The title page showing the illustrative figure should be deleted to appear as per attached title page.

Signed and Sealed this

Twenty-fifth Day of December, 1990

Attest:

HARRY F. MANBECK, JR.

Attesting Officer

Commissioner of Patents and Trademarks

United States Patent [19]

Fimian et al.

[11] Patent Number: 4,920,263
[45] Date of Patent: Apr. 24, 1990

[54] RADON DETECTION SYSTEM

[75] Inventors: Keith S. Fimian, Dunn Loring; John E. McGreevy, McLean; Brian P. Fimian, Falls Church, all of Va.; Richard W. Tucker, Timonium, Md.

[73] Assignee: Gemini Research, Inc., McLean, Va.

[21] Appl. No.: 148,729

[22] Filed: Jan. 26, 1988

[51] Int. Cl.⁵ .......................... G01T 1/20; G01V 5/00
[52] U.S. Cl. ........................... 250/255; 250/253
[58] Field of Search ..................... 250/256, 253, 255

[56] References Cited

U.S. PATENT DOCUMENTS

| | | | |
|---|---|---|---|
| 3,169,188 | 2/1965 | Horner et al. | 250/484.1 C |
| 3,283,153 | 11/1966 | Geiger | 250/253 |
| 3,426,197 | 2/1969 | Waly et al. | 250/484.1 C |
| 3,502,876 | 3/1970 | Lasseur | 250/370 A |
| 3,665,194 | 5/1972 | Alter et al. | 250/253 |
| 3,805,070 | 4/1974 | Auxier et al. | 250/370 A |
| 3,914,602 | 10/1975 | Goldstein | 250/253 |
| 3,922,555 | 11/1975 | Chapuis et al. | 250/472 |
| 3,968,371 | 7/1976 | Greendale | 250/380 |
| 4,053,775 | 10/1977 | Franklin et al. | 250/364 |
| 4,055,762 | 10/1977 | Durkin | 250/253 |
| 4,104,523 | 8/1978 | Wolfert | 250/370 |
| 4,129,776 | 12/1978 | Fleischer | 250/253 |
| 4,140,912 | 2/1979 | Bressan et al. | 250/435 |
| 4,177,378 | 12/1979 | Stevens | 250/462.1 |
| 4,179,614 | 12/1979 | Felice et al. | 250/253 |
| 4,185,199 | 1/1980 | Droullard et al. | 250/435 |
| 4,216,380 | 8/1980 | Stieff | 250/255 |
| 4,268,748 | 5/1981 | Stieff | 250/255 |
| 4,297,574 | 10/1981 | Card et al. | 250/253 |
| 4,336,451 | 6/1982 | Stieff | 250/255 |
| 4,338,523 | 7/1982 | Alter | 250/472 |
| 4,352,014 | 9/1982 | Powell | 250/253 |
| 4,417,142 | 9/1982 | Malmqvist et al. | 250/253 |
| 4,426,575 | 1/1984 | Malmqvist et al. | 250/253 |
| 4,468,558 | 8/1984 | Malmqvist et al. | 250/253 |
| 4,518,860 | 5/1985 | Alter et al. | 250/253 |
| 4,607,165 | 8/1986 | Burghoffer et al. | 250/435 |
| 4,678,916 | 7/1987 | Thomson | 250/370 |
| 4,700,070 | 10/1987 | Kovac | 250/304 |

FOREIGN PATENT DOCUMENTS

1191982 5/1970 United Kingdom .............. 250/253

OTHER PUBLICATIONS

McCorkell et al., "An Apparatus for the Measurement of the Rates of Emanation of Radon from Rock Specimens and Powders," *Rev. Sci. Instrum.*; vol. 51(4), pp. 459–463 (1980).

Flynn, "The Determination of Low Levels of Polonium-210 in Environmental Materials," *Anal. Chim. Acta.*; vol. 43, pp. 221–227 (1968).

At Ease Radon Monitor, Models 1020 and 1021, Sun Nuclear Corporation (not dated).

Model 100 CIRAS System, Alpha Nuclear (not dated).

(List continued on next page.)

*Primary Examiner*—Janice A. Howell
*Assistant Examiner*—Richard Hanig
*Attorney, Agent, or Firm*—Venable, Baetjer and Howard

[57] ABSTRACT

A radon detection system is provided with the capability of monitoring certain environmental parameters together with certain other conditions indicative of possible tampering. The environmental data allows the calculation of an accurate projection of average long-term radon levels in the structure under test on the basis of a relatively short measurement period, while the tamper data indicates whether an attempt has been made to tamper with the detection unit or the measurement conditions during the test period. When an indication of possible tampering occurs, the system enters an accelerated data collection mode during which data is gathered that can later be used to determine whether tampering has actually occurred. The detection system may be provided with first and second detectors for separately monitoring airborne levels of radon gas and radon decay products. The radon gas detector may include a scintillation cell, and means may be provided to purge and then bypass the scintillation cell when high radon gas concentrations are detected. Methods for measuring and reporting radon gas and decay product concentrations are also disclosed.

73 Claims, 13 Drawing Sheets